US007149734B2

United States Patent
Carlson et al.

(10) Patent No.: US 7,149,734 B2
(45) Date of Patent: *Dec. 12, 2006

(54) MANAGING REUSABLE SOFTWARE ASSETS

(75) Inventors: Brent A. Carlson, Rochester, MN (US); Dave H Gross, Rochester, MN (US); Timothy J Graser, Rochester, MN (US); Debra L Mariner, Oronoco, MN (US); John J Palof, Kenyon, MN (US); Paul W Tamminga, Rochester, MN (US)

(73) Assignee: Logic Library, Inc., Rochester, MN (US)

( * ) Notice: Subject to any disclaimer, the term of this patent is extended or adjusted under 35 U.S.C. 154(b) by 686 days.

This patent is subject to a terminal disclaimer.

(21) Appl. No.: 10/109,601

(22) Filed: Mar. 26, 2002

(65) Prior Publication Data

US 2003/0046282 A1   Mar. 6, 2003

Related U.S. Application Data

(63) Continuation-in-part of application No. 09/900,101, filed on Jul. 6, 2001.

(51) Int. Cl.
*G06F 7/00* (2006.01)
*G06F 9/44* (2006.01)

(52) U.S. Cl. .......................... 707/6; 717/104; 717/120; 707/3

(58) Field of Classification Search ........ 717/100–102, 717/107–108; 707/102–103
See application file for complete search history.

(56) References Cited

U.S. PATENT DOCUMENTS

| 5,361,355 | A | 11/1994 | Kondo et al. |
| 5,446,575 | A | 8/1995 | Lysakowski, Jr. |
| 5,980,096 | A | 11/1999 | Thalhammer-Reyero |
| 6,023,702 | A | 2/2000 | Leisten et al. |
| 6,055,543 | A | 4/2000 | Christensen et al. |
| 6,067,548 | A | 5/2000 | Cheng |

(Continued)

*Primary Examiner*—Wei Zhen
*Assistant Examiner*—Chih-Ching Chow
(74) *Attorney, Agent, or Firm*—Shumaker & Sieffert, P.A.

(57) ABSTRACT

In general, techniques are described that facilitate the reuse of software assets within an enterprise. A software asset, as used herein, refers to a set of one or more related artifacts that have been created or harvested for the purpose of applying that asset repeatedly in subsequent development environments. A system, for example, is described that includes a repository to store artifacts, and an asset source to generate a software asset based on the artifacts. The system further includes an asset management system to receive the software asset from the asset source and store the software asset within an asset library. The system may further include a model having one or more elements, and an asset retrieval module to selectively retrieve a subset of the software assets from the asset library based on input from a user identifying one or more of the elements.

32 Claims, 35 Drawing Sheets

U.S. PATENT DOCUMENTS

| | | |
|---|---|---|
| 6,092,075 A | 7/2000 | Carey et al. |
| 6,134,706 A | 10/2000 | Carey et al. |
| 6,202,205 B1 | 3/2001 | Saboff et al. |
| 6,230,315 B1 | 5/2001 | Nicholas |
| 6,349,237 B1 | 2/2002 | Koren et al. |
| 6,366,930 B1 | 4/2002 | Parker et al. |
| 6,405,179 B1 | 6/2002 | Rebane |
| 6,427,230 B1 * | 7/2002 | Goiffon et al. ............. 717/108 |
| 6,662,357 B1 | 12/2003 | Bowman-Amuah |
| 6,678,882 B1 | 1/2004 | Hurley et al. |
| 2002/0073114 A1 * | 6/2002 | Nicastro et al. ............ 715/500 |
| 2002/0156702 A1 * | 10/2002 | Kane ........................... 705/27 |
| 2002/0158880 A1 | 10/2002 | Williams et al. |
| 2002/0169658 A1 | 11/2002 | Adler |

* cited by examiner

| | | | | | |
|---|---|---|---|---|---|
| DRM | IndLifeInsDRMSample | | | | |
| Create Date | 04/05/01 | | | | |
| Last Modified Date | 04/05/01 | | | | |

Non-Functional Requirements     Edit

Target Functions     Edit

| Function Name | Weight |
|---|---|
| DetermineFederalWithholdingAmount:FederalWithholdingTaxFunctions:DetermineRequiredFWT | 9 |
| PolicyRecordManagement.PolicyRecordFunctions:GetTaxIDNumber | 3 |

Scoring Parameters

| | |
|---|---|
| Asset level affinity threshold | 60 |
| Function level affinity threshold | 9 |
| Allow functions with partial functionality | Yes |
| Allow functions with additional functionality | Yes |

Attached Assets

| Name | Version | Description | Supplier | Type | Library |
|---|---|---|---|---|---|
| Customer Profile | 1.0 | Organizes customer information (addresses, phone numbers, etc.) | IBM | JSP | B |
| Product Catalog | 1.1 | Organizes product information (categories, product details, cross-sell info, etc.) | IBM | JSP | A |
| Tax Bridge | 1.0 | Tool for life insurance companies to administer policy level taxation in a compliant manner | Practical Computing, Inc. | EJB | A |

Asset Name: Asset 1
Asset Version: V1.0
Description: This is Asset 1

Note: _____.
       _____.

Carol McGrath   "Pending Approval"   Monday, February 26th, 2001 9:15 am
   This component meets both the technical and business requirements for our project. We need a license ASAP as this is a time critical project.

Close

*Fig. 33*

Search for:

| Asset License(s) ▼ |

[          ]

[ SEARCH ]

[ LogicLibrary Web ]

[ Information Center ]

[ Support Center ]

[ Asset Licenses ]

[ Asset Requests ]

Add New Company-Wide Asset License

<u>Save</u>  <u>Clear</u>

Library :  [ Library ID    Library Name   ▼ ]

Asset:    [ Asset Name & Version    Description   ▼ ]

License Data: _____
_____
_____
_____

Purchaser Note: _____
_____
_____

[ Save ]  [ Clear ]

*Fig. 34*

| Published Assets ▼ | Angela's Published Assets | | | |
|---|---|---|---|---|
| [SEARCH] | Asset Name | Version | Description | Last Published Date |
| LogicLibrary Web | Asset 1 | V1.0 | This is Asset 1 | Published 2/21/01 |
| Information Center | Asset 2 | V3.1 | This is Asset 3 | Published 3/01/01 |
| Support Center | Asset 4 — 334 | V2.2 | This is Asset 4 | Published 3/05/01 |
| Organizational Groups | Un-Published Assets in Repository | | | |
| Asset Views | Asset Name | Version | Description | Publish Asset |
| Profiles | Asset 2 | V1.0 | This is Asset 2. | Publish |
| Projects | Asset 5 | V0.9 | This is Asset 5 | Publish |
| Users | | | | |
| Non-Functn'l Req Sets | | | | |
| Reports | | | | |
| TCS/TAQS Status | | | | |

*Fig. 35*

MANAGING REUSABLE SOFTWARE ASSETS

This application is a continuation-in-part and claims priority from U.S. patent application entitled "Targeted Asset Capture, Identification, and Management," filed Jul. 6, 2001, and having U.S. Ser. No. 09/900,101, and U.S. patent application entitled "Generating Reusable Software Assets from Distributed Artifacts" to Brent A. Carlson et. al., filed Mar. 18, 2002, and having U.S. Ser. No. 10/100,749, the entire contents of each of which are incorporated herein by reference.

TECHNICAL FIELD

The invention relates to computer software, and more particularly, managing reusable software assets.

BACKGROUND

Over the past several years, software development efforts within enterprises have grown tremendously, resulting in large volumes of software code, documentation, models, and other related artifacts. A large enterprise, for example, may have a significant number of ongoing software development projects at any one time ranging in size from small projects involving a handful of programmers to massive endeavors involving hundreds of programmers.

In the past few years, there has been a tremendous amount of work in the area of software engineering and, in particular, the reuse of software across development projects. Reusing software can have significant advantages in, for example, reducing the resources, expense, and development time for a software project. Identifying artifacts for reuse from the various repositories of a given enterprise, however, can be a complex task. In addition to the problems involved in identifying a potentially massive number of artifacts, the artifacts are typically stored within repositories dispersed throughout the enterprise, and maintained by specialized development or operational environments.

SUMMARY

In general, the invention is directed to techniques that facilitate the reuse of software assets within an enterprise. A software asset, as used herein, refers to a set of one or more related artifacts that have been created or harvested for the purpose of applying that asset repeatedly in subsequent development environments. Source code and binary code are examples of artifacts for software assets. Other examples of artifacts include related documentation, such as requirement specifications, design documents, operation manuals, and the like. Additional examples of artifacts include models, such as a process model, structural model, resource model, implementation model, and the like, that may include use cases, object models, collaboration diagrams, deployment models, and the like.

In one embodiment, a system comprises a repository to store artifacts, and an asset source to generate a software asset based on the artifacts. The system further comprises an asset management system to receive the software asset from the asset source and to store the software asset within an asset library.

In another embodiment, a system comprises a plurality of repositories to store artifacts, and asset templates that define schemas for reusable software assets in accordance with a data description language. The system further comprises a plurality of asset sources to monitor the repositories and generate software assets having metadata that reference the artifacts in accordance with schemas of the asset templates, and an asset management system to receive the software assets from the asset sources and store the software assets within an asset library.

In another embodiment, a system comprises a plurality of repositories to store artifacts, and a multi-level hierarchy of asset sources to generate software assets having metadata that reference the artifacts. The higher-level asset sources of the hierarchy receive software assets from low-level asset sources of the hierarchy and form aggregate software assets. The system further comprises an asset management system to receive the aggregate software assets from the hierarchy of asset sources and store the aggregate software assets within an asset library.

In another embodiment, a system comprises a model having one or more elements, and a database to store reusable software assets. The system further comprises an asset retrieval module to receive input from a user selecting an element of the model, and to selectively retrieve a subset of the software assets from the database based on the input.

In another embodiment, a method comprises retrieving artifacts from repositories, and generating software assets based on the artifacts in a form that conforms to a data description language. The method further comprises publishing the software assets for storage within an asset library.

In another embodiment, a method comprises receiving input from a user selecting one or more elements of a model, and retrieving software assets from an asset library based on the selected elements.

In another embodiment, a computer-readable medium comprises instructions to cause a processor to receive input from a user selecting one or more elements of a model, and retrieve software assets from an asset library based on the selected elements.

In another embodiment, a computer-readable medium comprises data structures that store software models having elements, and software assets having metadata that maps the software asset to the elements of the software models.

The techniques described herein may offer one or more advantages. For example, an enterprise may make use of distributed asset sources to provide generalized interfaces to diverse repositories, and to generate software assets in a normalized form that complies with a data description language. The software assets may be generated, for example, in accordance with one or more asset templates that define schemas for the assets. A user, such as a library administrator, may readily modify the asset templates to easily control the content and structure of the reusable software assets. This level of abstraction can be leveraged to automate or semi-automate the process of capturing artifacts from the repositories. In this manner, the asset management system provides users with a centralized asset library that offers a consistent, normalized view of the artifacts maintained over the many diverse repositories. In addition, an enterprise can make use of the system for bulk entry of assets, thereby simplifying and accelerating the process of capturing legacy software assets within the enterprise.

The asset management system can be configured to provide a full range of asset capture activities, ranging from fully-automated asset capture to semi-automated or manual approaches that require at least some manual intervention during the capture process. Accordingly, the asset management system can be configured to automatically capture assets from the repositories and produce normalized assets, or to automatically require the augmentation of the assets with artifacts not present within the repositories.

Among many other possible advantages, the asset management system provides for the association of software assets captured from diverse repositories with elements of software models, such as a process model, a structural model, a resource model, an implementation model, and the like. Accordingly, users can develop specifications for software projects, for example, and easily identify reusable software assets within the asset library that may be leveraged for the project.

The invention includes a targeted asset capture system that maps software resources to a domain model, and search and management tools for retrieving asset information and controlling asset acquisition. The domain model may include a process-centered organization and/or a structural organization of model tasks, functions, and data types. Capture includes mapping to the model functions and data types, and preferably also includes capturing other information about the asset and about the quality of mapping. The domain model may be used to build a search specification for searching for available assets that meet some or all of a set of functional (and/or nonfunctional) requirements. The search specification may also be published in part or in whole as a development specification.

In one aspect, the invention comprises an asset capture software utility. The utility includes a database for cataloguing software resource information, and means for mapping functions and data types to a predetermined domain model. The domain model may be a two-part model comprising a process model and a structural model, which may be linked to one another. There may be multiple process models for a single structural model. The utility may use synonyms to suggest mappings to the domain model. The mapping means may include means for adding user comments, such as comments on the character or quality of the mapping or on the usage or purpose of certain functions and data types.

In another aspect, the invention comprises a database of resource information, where the resource information includes functionality information mapped to a predetermined domain model. The database may include a search engine, for example an engine that can score resources according to how well they match functional or nonfunctional requirements. The search engine may include means for creating a persistent search specification that can be used by multiple users. Individual resources may be attached to the search specification for consideration. The search specification may be publishable, in whole or in part, as a requirements specification for software development. The search engine may notify one or more users of additions to the database that match a persistent search specification. Functionality information may be mapped over multiple domain models. The database may include means for viewing the domain model (e.g., graphically) in order to specify a search. The means may include means of navigating between process-side and structural-side of a domain model. The database may also include resource usage information, which may be linked to projects and may include information such as licensing data, resource acquisition tools, and usage reporting tools.

In a further aspect, the invention includes methods of classifying resources against a domain model, by mapping resource data types to model data types and resource functions to model functions, and storing the results in a searchable database. The domain model may include a process model and a structural model, which may be linked together. Multiple process models may also be linked to a single structural model. The method may include using synonyms to search model function and data type descriptions. Comments may be added to the database, for example on the quality of the mapping or on individual function or data type usage or purposes. The method may also include forwarding asset acquisition requests to an acquirer and storing acquisition information such as license keys. The method may also include generating usage reports or acquisition request reports.

In still another aspect, the invention includes methods of managing resources within an enterprise, by maintaining a searchable database of resource information including location information and functionality information, the functionality information being mapped to a domain model. The methods may include searching the database for resources that match functional or nonfunctional requirements, for example by creating a persistent search specification. A persistent search specification may be shared between users and/or published as a requirements document. Assets may be attached to the persistent search specification, and the method may include publishing the portions of the specification that are not matched by the attached assets. One or more users may also be notified when resources are added to the database that match the persistent search specification. The method may further include forwarding requests for resource acquisition to an acquirer, and storing acquisition information such as license keys. The method may also include generating reports on acquisition requests and/or resource usage.

In yet another aspect, the invention includes methods of mapping software resources to a domain reference model, including determining functions and data types to be mapped, sorting them into an order from most simple to most complex, and presenting them to a user in the determined order for mapping. As the user is presented with individual functions and data types, previously created mappings are used to refine further mapping suggestions. The determined order may include, for example, viewing all data types before viewing functions. The user may elect to map functions and data types in a different order.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 29 is a window showing attachment of resources to a search specification.

FIG. 32 is a window showing pending acquisition requests.

FIG. 33 is a window showing the details of requests for a pending asset.

FIG. 34 is an asset acquisition screen.

FIG. 35 is a window showing an asset usage summary.

DETAILED DESCRIPTION

Figure 1:
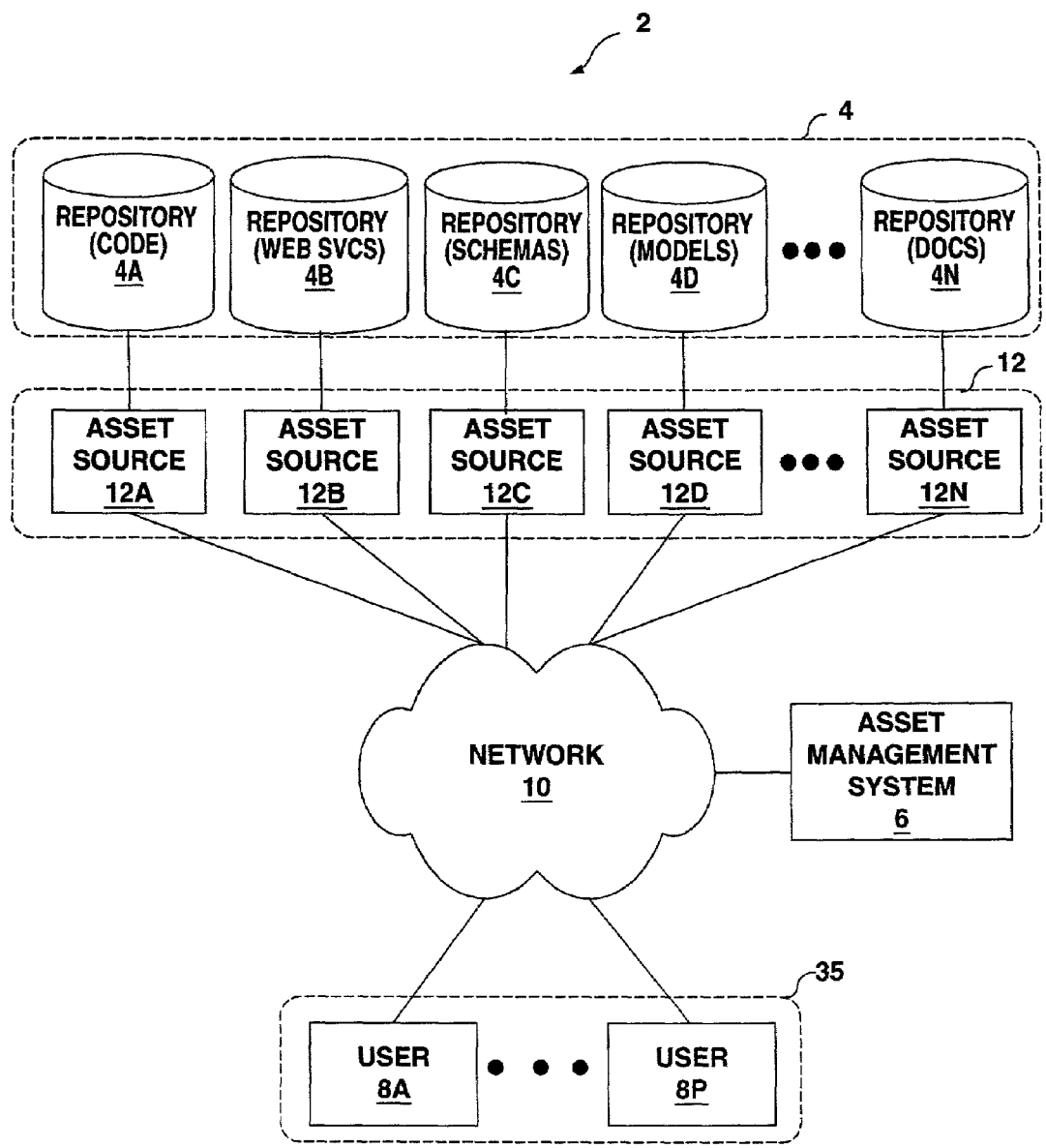
FIG. 1 is a block diagram illustrating an example system that facilitates the reuse of assets within an enterprise generally.

FIG. 1 is a block diagram illustrating an example system 2 that facilitates the reuse of software assets within an enterprise generally. In general, a reusable software asset, as used herein, refers to a set of related artifacts that have been created or harvested for the purpose of applying that asset repeatedly in subsequent development environments. Examples of artifacts for software assets include the source code or binary code for the software asset. Other examples include documentation such as a requirements specification, design document, and the like. Additional examples of artifacts include use cases, object models, collaboration diagrams, deployment models, and the like. Further examples include operational artifacts deployed within operational environments of the enterprise, such as component instances deployed within an application server.

Repositories 4A–4N (herein repositories 4) represent any data source within an enterprise that stores information (herein artifacts) relevant to the management of reusable assets. Repository 4A may store, for example, reusable software components. These components are typically independently deployable code elements that often conform to a standardized component model, such as Enterprise Java-Beans (EJB) and the Component Object Model (COM). These components typically have well-defined interfaces that provide access to the encapsulated services or functions. An example of this type of repository includes a source code development environment that often stores the source code and the executable code within a repository to provide version control and to facilitate collaborative development.

As another example, repository 4B may store code elements that present functional interfaces to web services (web svcs) for remote access by client software via networking protocols, such as HTTP, HTTPS, FTP, SOAP, XML messaging, and the like. The enterprise may make use of these assets for quickly assembling web-based applications. One example of this type of software asset includes a server-side code element for providing web-based financial transactions.

As another example, repository 4C may store schemas that conform to a data description language, such as XML, that can be used to assemble metadata for data transfer within the enterprise. Repository 4D may store modeling information (models) that provides formal representations of various software components. The modeling information may include use cases, object models, collaboration diagrams, deployment models, and the like. The modeling information may conform to the Unified Modeling Language (UML), for example. Repository 4N may store documentation related to the software components, including requirements specifications, design documents, and the like.

In addition, the artifacts stored by repositories 4 are not limited to those artifacts generated during the development of the software components, but can encompass artifacts related to the deployment of the asset, such as particular instances of the software components. Accordingly, system 2 can be used to aggregate artifacts generated through the lifecycle of the asset, including artifacts generated during the development of the asset through the deployment of various instances of the asset, and artifacts generated through ongoing tracking of that asset within the operational environment. Examples of operational artifacts deployed within operational environments of the enterprise include component instances deployed within an application server.

Repositories 4 may also comprise "active" repositories that manage data related to an asset in arbitrary form, and present "views" of that assemble the data into a consumable form. For example, a defect tracking system may manage any number of defects that can be organized into views related to specific assets, e.g., views that show only those defects pertinent to particular versions of assets under development.

Generally, these artifacts are likely developed and maintained within repositories 4 using specialized development tools. Accordingly, repositories 4 may comprise a variety of storage facilities having very diverse interfaces. System 2 makes use of one or more asset sources 12A–12N (herein asset sources 12) that provide a generalized, abstract interface to the underlying repositories 4. Asset sources 12 interact with repositories 4 to extract the artifacts, and assemble related artifacts to provide composite, normalized views of the reusable software assets. In particular, asset sources 12 generate asset descriptions that describe the related artifacts for each asset in a normalized form.

Asset sources 12 output the software assets in a normalized form that complies with a data description language. In other words, the software assets include or reference artifact data from repository 4A, as well as metadata that conforms to the data description language. The data description language describes the format, organization and structure of the asset. Accordingly, the normalized assets produced by asset sources 12 may take the form of electronic documents, files, scripts, data streams, software objects, and the like, that contain the metadata conforming to the data description language. Other example languages include Extensible Style Language (XSL), Extensible Linking Language (XLL), Standardized Multimedia Authoring Language (SMIL), as well as variations of the Standard Generalized Markup Language (SGML).

As described in detail below, users 8A can readily tailor each of asset sources 12 to the particular requirements of the corresponding one of repositories 4. As described in detail below, users 8 may use asset definition templates to generically describe the normalized assets produced by asset sources 12.

Asset management system 6 provides a centralized resource for collecting the asset descriptions from asset sources 12, and for publishing the asset descriptions to make the descriptions available to users 8A–8P (herein users 8) within the enterprise. More specifically, asset management system 6 provides a comprehensive, searchable view of the software assets and related artifacts stored within the various repositories 4. By interacting with asset management system 6, users 8 can identify and make use of the assets.

System 2 may provide one or more advantageous features for capturing and managing reusable software assets. The use of asset sources 12 to provide a generalized interface to diverse repositories 4 can be leveraged to automate or semi-automate the process of capturing artifact information from repositories 4. Accordingly, an enterprise can make use of system 2 for bulk entry of assets, thereby simplifying and accelerating the process of capturing legacy software assets within the enterprise. In addition, asset management 6 and asset source 12 provide users 8 with a consistent, normalized view of the artifacts maintained over the many diverse repositories 4. Furthermore, asset management system 6 and asset sources 12 may interact so as to provide a current view of repositories 4, even though repositories 4 may change over time.

Furthermore, asset management system 6 and asset sources 12 can be configured to provide a full range of asset capture activities, ranging from fully-automated asset capture to semi-automated or manual approaches that requires at least some manual intervention of users 8 during the capture process. Accordingly, asset management system 6 and asset sources 12 automatically make available to users 8 assets that are automatically generated from repositories 4. In addition, asset management system 6 and asset sources 12 can be configured to allow users 8 to augment the assets with artifacts not present within repositories 12 during the capture process.

Figure 2:
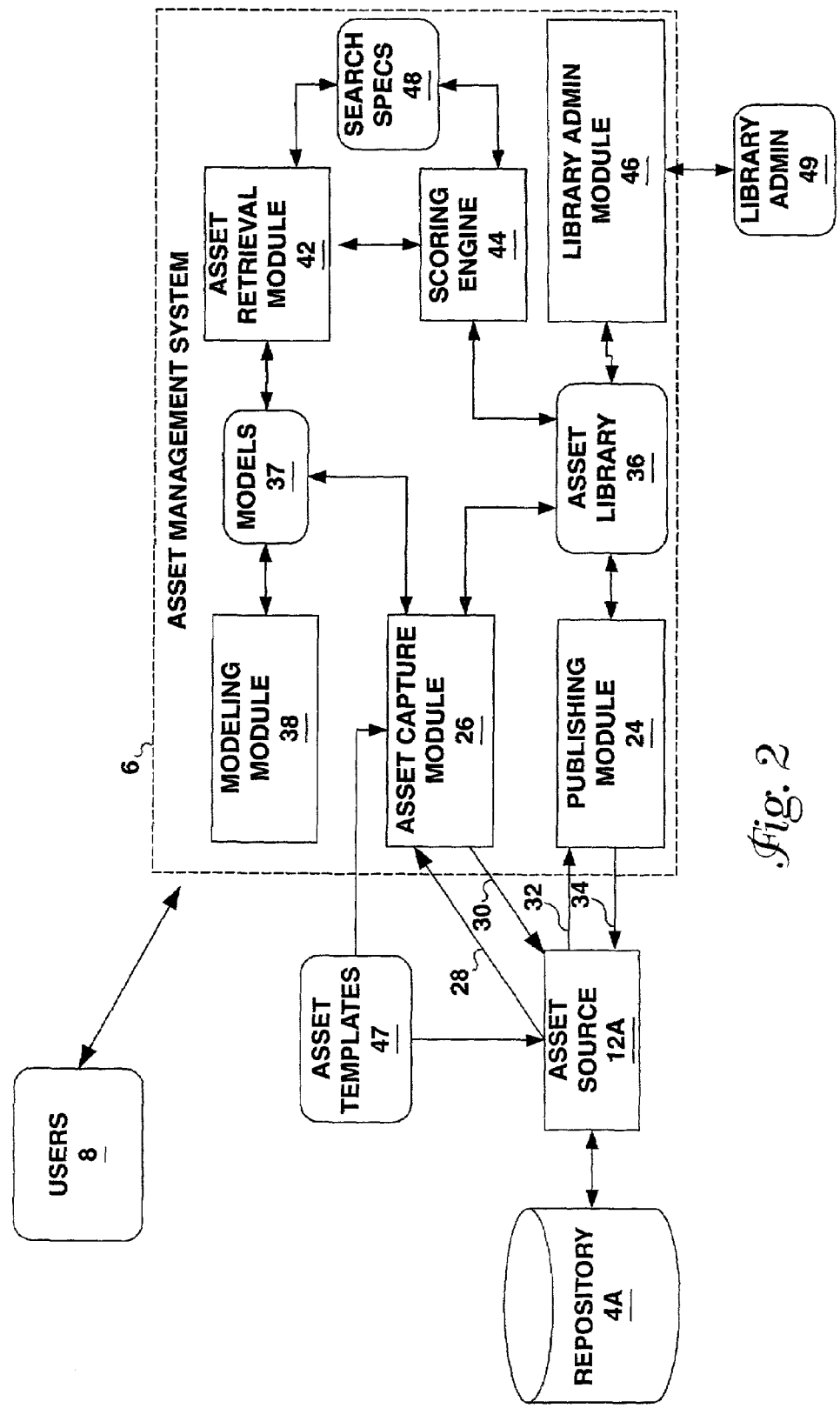
FIG. 2 is a block diagram illustrating an example embodiment of an asset management system.

FIG. 2 is a block diagram illustrating an example embodiment of asset management system 6 of FIG. 1. Asset management system 6 comprises a number of cooperative modules that facilitate the management of reusable software assets.

For example, asset management system 6 may include publishing module 24 and asset capture module 26 that interact with asset sources 12 to collect and aggregate artifacts from repositories 4 (FIG. 1), such as asset source 12A and repository 4A, as illustrated for exemplary purposes in FIG. 2. Generally, asset source 12A collects and normalizes assets from repository 4A. In addition, asset source 12A provides an abstract interface for interaction with publishing module 24 and asset capture module 26, thereby hiding the specific requirements of repository 4A from these modules.

In general, asset capture module 26 can augment the information extracted from repository 4A, and provides for resolution of conflicts between the extracted information and information required for publication of the asset by asset source 12A. Upon receiving notification 28 from asset source 12A indicating the availability of a new or updated asset, asset capture module 26 issues one or more messages 30 to asset source 12A to retrieve the asset. Messages 30 may comprise, for example, Simple Object Access Protocol (SOAP) messages, Remote Method Invocation (RMI) calls, or any other mechanism for communication between modules. In addition, asset capture module 26 may access asset library 36 to retrieve a current instance of the asset being produced by asset source 12A. Asset capture module 26 may present the current instance of the asset as well as the asset produced by asset 12A to user 39 for reconciliation.

Asset source 12A and asset capture module 26 make use of asset templates 47 to validate the asset information. In one embodiment, asset source 12A, or a schema generation module, generates a virtual schema in accordance by applying asset templates 47 to a base schema for an asset. Asset templates conform to a data description language, such as the extensible markup language (XML), and may include definition templates and constraint templates. The base schema conforms to a schema definition language, and defines a class of elements that conform to the data description language. In this manner, the base schema may remain static and need not be modified to support new classes of assets.

To define classes of permissible assets, a user, such as one of users 8 or library administrator 49, may create definition templates, constraint templates, or both. More specifically, the user may create one or more definition templates that define sub-classes for the elements defined by base schema. In this manner, the user can extend the element definitions of base schema without modifying base schema.

In addition, the user may create one or more constraint templates that define requirements for instances of the elements. Constraint templates may define requirements for instances of elements belonging to the classes defined by base schema, instances of elements belonging to the sub-classes defined by definition templates, or both. For example, constraint templates may define a required cardinality for the instances of the elements, a required minimum or maximum number of the instances, a range for a required number of the instances of the elements, a required attribute for the instances, a required parameter value for the instances of the elements, specific required instances of the elements, and the like.

Asset source 12A generates the schema information of virtual schema by first generating a data structure representing the classes of elements defined by base schema. Asset source 12A then applies definition templates to base schema to extend the schema information to include the sub-classes of elements defined within definition templates. Finally, Asset source 12A applies constraint templates to update the schema information to include the restrictions defined by constraint templates.

Definition templates and constraint templates conform to the data description language to which the elements of base schema comply, e.g., XML. Accordingly, the user can easily create and modify definition templates and constraint templates, and need only modify base schema in order to support new classes of assets.

Asset source 12A and asset capture module 26 may use asset templates 47 to drive the asset capture process. Based on the content and structure described by the asset schemas, which may be dynamically generated from asset templates 47, asset source 12A and asset capture module 26 identify any incomplete artifact data that needs to be added to the capture asset, either manually or in automated fashion. In this manner, asset source 12A can produce assets in a normalized form that complies with the schema information. The assets are normalized in the sense that the assets are described in a data description language, such as XML, and the elements and attributes are substantially similar.

The following pseudocode illustrates an exemplary base schema, definition template and constraint template that may be used for capturing information related to reusable software assets. In particular, the following exemplary base schema defines a parent class of elements named ASSET, and two child classes of elements named KEYWORD and RELATION.

```
<XSD:SCHEMA >
    <XSD:ELEMENT NAME="ASSET">
        <XSD:ELEMENT NAME="KEYWORD" MINOCCURS="0" MAXOCCURS="UNBOUNDED">
            <XSD:ATTRIBUTE NAME="NAME" TYPE="XSD:STRING" USE="REQUIRED "/>
            <XSD:ATTRIBUTE NAME="VALUE" TYPE="XSD:STRING" USE="REQUIRED"/>
        </XSD:ELEMENT>
        <XSD:ELEMENT NAME="RELATION" MINOCCURS="0" MAXOCCURS="UNBOUNDED">
            <XSD:ATTRIBUTE NAME="ROLE" TYPE="XSD:STRING" USE="REQUIRED"/>
            <XSD:ATTRIBUTE NAME="ID" TYPE="XSD:ID" USE="REQUIRED"/>
            <XSD:ATTRIBUTE NAME="TYPE" TYPE="XSD:STRING" USE="REQUIRED"/>
        </XSD:ELEMENT>
        <XSD:ATTRIBUTE NAME="NAME" TYPE="XSD:STRING" USE="REQUIRED"/>
        <XSD:ATTRIBUTE NAME="TEMPLATE" TYPE="XSD:STRING" USE="REQUIRED"/>
    </XSD:ELEMENT>
</XSD:SCHEMA>
```

The following exemplary definition template illustrates the definition of sub-classes for the classes of elements KEYWORD and RELATION, thereby extending the definitions provided by the above-listed exemplary base schema.

```
<TEMPLATE NAME="ASSET-DEFINITION-TEMPLATE" PARENT="ASSET-SCHEMA.XSD">
    <DEFINE-KEYWORD NAME="CATEGORY" TYPE="STRING">
        <ADD-VALUE VALUE="FINANCE"/>
        <ADD-VALUE VALUE="BANKING"/>
    </DEFINE-KEYWORD>
    <DEFINE-KEYWORD NAME="PRICE" TYPE="DECIMAL"/>
    <DEFINE-KEYWORD NAME="ALIAS" TYPE="STRING"/>
    <DEFINE-RELATION ROLE="USES" TYPE="ASSOCIATION"/>
    <DEFINE-RELATION ROLE="PREDECESSOR" TYPE="PREVIOUS-VERSION">
        <MAX-OCCURS VALUE="1"/>
    </DEFINE-RELATION>
</TEMPLATE>
```

The above-illustrated exemplary definition template makes use of elements DEFINE-KEYWORD and DEFINE-RELATION to define specific sub-classes for these respective classes of elements defined by the exemplary base schema. More specifically, for class KEYWORD, the exemplary definition template defines a sub-class CATEGORY having two possible values: FINANCE and BANKING The exemplary definition template defines two additional sub-classes for the class KEYWORD including PRICE and ALIAS. For the class RELATION, the definition template defines two sub-classes of USES and PREDECESSOR.

The following exemplary constraint template provides requirements for the use of, and constraints for, the instances of the elements.

The above-illustrated exemplary constraint template makes use of elements USE-KEYWORD and USE-RELATION to define specific requirements for instances for the sub-classes of elements defined by the definition template. More specifically, the exemplary constraint template 10 allows at least one instance of an element belonging to the sub-class CATEGORY. The exemplary constraint template further allows at most one instance of an element belonging to the sub-class PRICE. Similarly, the exemplary constraint template allows at least one instance of an element belonging to the sub-class PREDECESSOR, and requires at least one instance of an element belonging to the sub-class USES.

The following pseudocode illustrates an exemplary document that describes a reusable software asset, and which complies with the exemplary base schema, definition template, and constraint template listed above.

```
<TEMPLATE NAME="ASSET-CONSTRAINT-TEMPLATE" PARENT="ASSET-DEFINITION-TEMPLATE.XML">
    <USE-KEYWORD NAME="CATEGORY"/>
    <USE-KEYWORD NAME="PRICE">
        <MAX-OCCURS VALUE="1"/>
    </USE-KEYWORD>
    <USE-RELATION ROLE="PREDECESSOR"/>
    <USE-RELATION ROLE="USES">
        <MIN-OCCURS VALUE="1"/>
    </USE-RELATION>
</TEMPLATE>
```

```xml
<ASSET NAME="BANKING-ASSET-2.0" TEMPLATE="ASSET-CONSTRAINT-TEMPLATE.XML">
    <KEYWORD NAME="CATEGORY" VALUE="BANKING"/>
    <KEYWORD NAME="PRICE" VALUE="100.00"/>
    <RELATION ROLE="USES" ID="CURRENCY-ASSET-4.1" TYPE="ASSOCIATION"/>
    <RELATION ROLE="PREDECESSOR" ID="BANKING-ASSET-1.0" TYPE="PREVIOUS-VERSION"/>
</ASSET>
```

The form of asset capture module 26 may vary depending on whether asset management system 6 is configured for manual, semi-automated, or automated asset capture. Asset capture module 26 may comprise, for example, editing tools by which a user 39 can manually supply information to complete or augment the information captured from repository 4A. In addition, the user may interact with the editing tools to resolve any conflicts between the extracted asset information and the required information. For semi-automated or automated environments, asset capture module 26 may invoke one or more scripts to automate the augmentation of information with the asset information extracted by asset source 20. Asset capture module 26 may be embedded within asset management system 6 as illustrated, or remotely connected to the asset management system 6.

In some fully automated environments, asset source 12A may bypass asset capture module 26 by withholding notification 28, and may issue notification 32 to publishing module 24 indicating that the asset is ready for publishing to asset library 36. In fully automated environments, asset source 12A validates the asset information using asset definition templates 47.

Upon receiving notification 32, publishing module 24 issues messages 34 to asset source 12A to retrieve the normalized asset from asset source 12A. Upon retrieving the normalized asset, publishing module 24 stores the asset within asset library 36.

Asset management system 6 may further include a modeling module 38 that allows users 8 to develop models 37 that represent functionality of interest to the enterprise. For example, user 8 may interact with modeling module 38 to develop models 37 that may include process models, structural models, resource models, implementation models, and the like, for a software development project. Modeling module 38 may comprise an integrated proprietary modeling tool, or any conventional modeling tool capable of producing modeling information, such as Rational Rose™ from the Rational Software Corporation of Cupertino, Calif., or combinations of both such tools.

Asset retrieval module 42 allows users 8 to access and manage asset data within asset library 36. In particular, asset retrieval module 42 allows one or more users 8 to develop model-driven search specifications (search specs) 48. In other words, asset retrieval module 42 allows users 8 to select elements from one or more of models 37 to build search specifications 48. Scoring engine 44 scores each asset published by publishing module 24 against search specifications 48 to aid in identifying the most relevant assets within asset library 36. In this manner, users 8 can selectively retrieve assets from asset library 36 using modeling data from models 37 to guide the search process. Asset library 36 may be implemented as any data source, such as a relational database management system (RDBMS), an object-oriented database, flat files, and the like.

Library administration (admin) module 46 provides an interface by which library administrator 49 can manage asset library 36. For example, library administrator 49 may define rules that control the development of search specifications 48. In addition, library administrator 49 may edit asset templates 47 to define new asset types or update the schemas for existing asset types.

Figure 3:
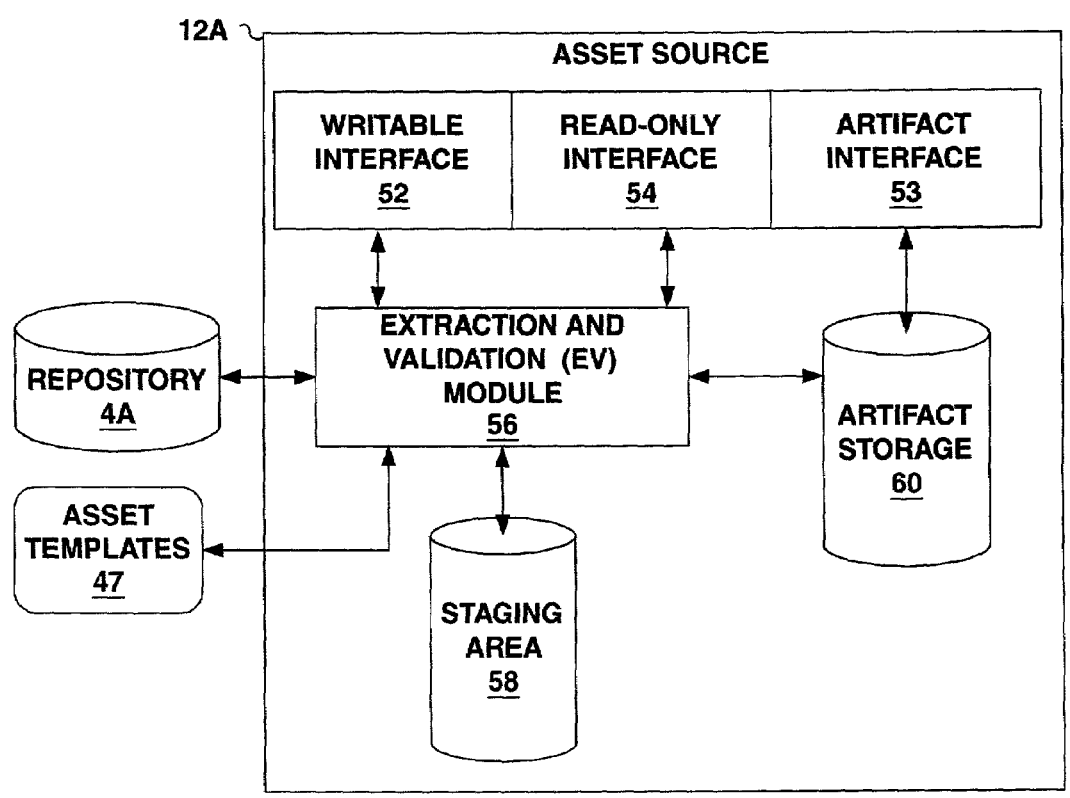
FIG. 3 is a block diagram illustrating an example embodiment of an asset source.

FIG. 3 is a block diagram illustrating an example embodiment of asset source 12A. Extraction and validation (EV) module 56 provides the core logic of asset source 12A, and may include one or more software components. EV module 56 periodically accesses repository 4A, or receives notifications from repository 4A, to identify any new or updated artifacts. Upon identifying any such artifact, EV module 56 generates an asset having metadata and data that may include or reference the new or updated artifact. EV module 56 caches an instance of the asset within staging area 58. EV module 56 validates the asset using asset templates 47 to identify whether the asset is ready for publishing, or perhaps requires reconciliation or further artifact data.

More specifically, EV module 56 generates the assets in a form compliant with a data description language, and may include metadata as well as actual artifact data, or references to artifacts stored within either repository 4A or artifact storage 60. Asset source 12A manages artifact storage 60 to store artifact data retrieved from repository 4A as needed, and provides artifact interface 53 for external access. Accordingly, upon publication to asset library 36 (FIG. 2), the stored assets may comprise metadata, artifact data, references to artifact data within artifact storage 60 of one or more asset sources 12 or a central artifact storage, or any combination thereof.

Asset source 12A includes a read-only interface 54 for use by publishing module 24 (FIG. 2) for extracting assets in a normalized form compliant with a data description language. In other words, publishing module 24 invokes read-only interface 54 to direct EV module 56 extract one or more asset from staging area 58. Upon receiving the assets from staging area 58 via read-only interface 54, publishing module 24 stores the assets within asset library 36.

In addition, asset source 12A may include a writable interface 52 that allows asset capture module 26 to augment the artifact information of the underlying repository 4A or artifact storage 60. Asset capture module 26 invokes read-only interface 54 to direct EV module 56 to extract one or more asset from staging area 58. Upon receiving the assets from staging area 58 via writable interface 52, asset capture module 26 augments the artifact data via writable-interface 52 using manual, semi-automated, or automated techniques, as described herein.

The following code illustrates exemplary embodiments for interfaces 52, 53, and 54, that may be provided by asset source 50.

```
/***** Artifact Repository Interface *****/
interface ArtifactRepository {

/* Get the installation unique ID of this ArtifactRepository */
```

```
public abstract String getId();

/* Retrieve the specified artifact from the repository. */
ArtifactStream getArtifact(String assetId, String artifactId);
}

/***** Writable Interface for Artifact Repositiory *****/
interface WriteableArtifactRepository extends ArtifactRepository {

/* Store the given artifact in the repository */
void storeArtifact(String assetId, String artifactId);

/** Remove the specified artifact from the repository */
void removeArtifact(String assetId, String artifactId);
}
/***** Read-only Interface for Asset Source *****/
interface AssetSource extends AssetRepository {

/* Get the installation unique ID of this AssetSource */
public abstract String getId();

/* Get the XML representation of the specified asset. */
public abstract String  getAsset(String assetId);

/* Get all publish-ready assets available from this AssetSource.  Returns
a collection of Strings that are the XML representation of the assets */
public abstract Collection getAssets();

/* This method is used as a callback from the ''consumer'' of this
AssetSource, such as the publishing  module, to indicate that it is now
using the asset and that the AssetSource should not allow changes to the
visble artifacts of the asset. */
public abstract void publishAsset(String assetId);

/* This method may be used to give the AssetSource an XML structure
consisting of a list of classifier criteria which is then used by the
```

AssetSource to expose only those assets from its underlying sources that meet the given criteria. */

```
public abstract void setFilter(String classificationCriteria)

/* Register the given consumer, such as the asset capture module or the
publishing module, for notification of new assets or changes to existing
assets. */
public abstract void registerConsumer(AssetSourceConsumer consumer);
}

/***** Writeable Interface for Asset Source *****/
interface WriteableAssetSource extends AssetSource,
WriteableArtifactRepository {

/* Create a new asset into the asset source (used by the asset capture
module to create new assets either from scratch or from existing XML asset
documents. */
public abstract void createAsset(String assetXMLDoc);

/** Update an existing Asset in the repository. */
public abstract void updateAsset(String assetXMLDoc);

/* Remove an Asset from the repository */
public abstract void removeAsset(String assetId);
}
```

Figure 4:
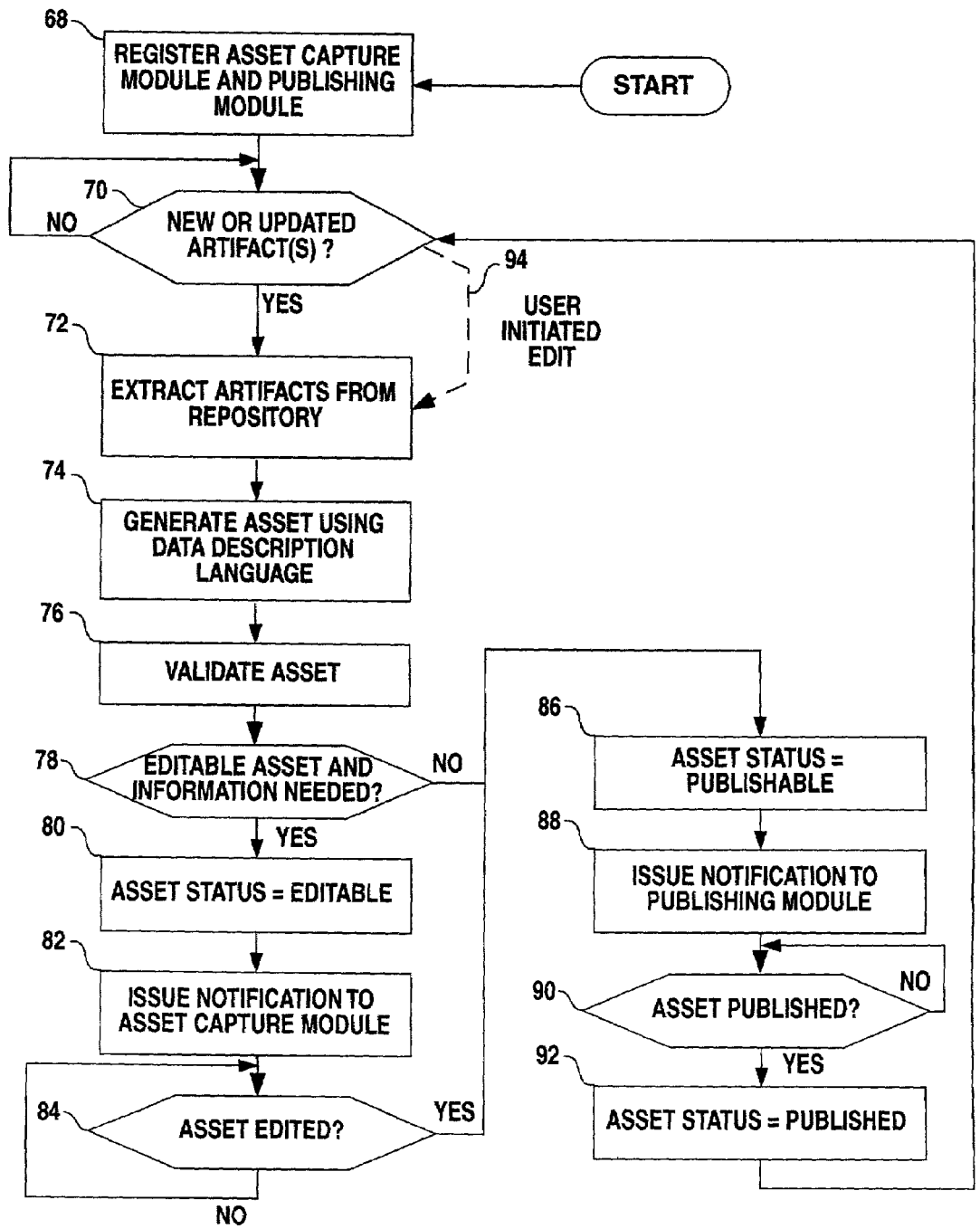
FIG. 4 is a flowchart illustrating in further detail the interactions between the asset management system and the asset sources to facilitate the reuse of assets within an enterprise.

FIG. 4 is a flowchart illustrating in further detail the interactions between an example asset management system 6 (FIG. 1) and asset sources 12 to facilitate the reuse of assets within an enterprise. Initially, publishing module 24 (FIG. 2) and asset capture module 26 of asset management system 6 register with each of asset sources 12 as potential "consumers" of assets (68). During the registration, each of publishing module 24 and asset capture module 26 may communicate a unique communication handle, such as a port number, socket handle, callback pointer, and the like, which asset sources 12 use of to communicate with the modules. In particular, asset sources 12 may use the communication handles to notify publishing module 24 and asset capture module 26 of new or updated assets.

When asset sources 12 detect new or updated artifacts within repositories 4 (70), the asset sources 12 extract the information from repositories 4 (72). Asset source 12A, for example, may extract new or updated artifact information stored within repository 4A. For exemplary purposes, the remainder of FIG. 4 is described in reference to asset source 12A and repository 4A.

After extracting the artifact information, asset source 12A, generates the asset based on the extracted artifact information in a form that complies with a data description language, such as XML, and stores the asset within staging area 58 (74). Asset source 12A selects one or more asset templates 47 that provide an asset schema for controlling the generation. During this process, asset source 12A validates the generated asset to determine whether any additional information is needed to augment or reconcile the artifact information (76).

If, based on the validation, additional information is need to augment or reconcile the artifact information, asset source 12A determines whether the asset is an editable asset, possibly based on configuration information or the asset schema provided by asset templates 47 (78). If so, asset source 12A sets a status of the asset as "editable" (80), and issues notification 28 to asset capture module 26 to indicate that an editable asset is available within staging area 58 (82).

In response, asset capture module 26 provides the required information, possibly in a manual, semi-automated, or fully-automated manner (84). In addition, asset capture module 26 may assist users 8 in reconciling the instance of the asset stored within staging area 58 with a current version of the asset that may be stored within asset library 36. Upon completion of the editing process by asset capture module 26, asset source 12A changes the status of the asset within staging area 58 from "editable" to "publishable" (86). Similarly, if the asset was non-editable, or if additional information was not needed (no branch of 78), asset source 12A bypasses asset capture module 26 and marks the asset as "publishable" (86).

Next, asset source 12A issues notification 32 to publishing module 24 that an asset within staging area 58 is ready for publishing (88). Finally, publishing module 24 retrieves the asset from asset source 12A (90), and publishes the asset to asset library 36, possibly in a manual, semi-automated, or fully-automated manner, thereby making the asset available to users 8 via asset retrieval module 42. Asset source 12A sets the status of the asset within the staging area as "published" (90), and repeats the process for subsequent new or updated asset artifacts.

The update and publication process described above need not be triggered by the detection of new or updated artifact information within a repository. User 8 may, for example, trigger the process by selecting an asset within asset library 36, and initiating an update process (as indicated by dashed line 94). In particular, asset capture module 26 may reconcile the instance of the asset generated by asset module 12A with a current version of the asset stored within asset library 36. User 8 may also initiate the creation of a new asset through this process by selecting one or more template(s) and proceed edit the newly created asset according to the templates.

Figure 5:
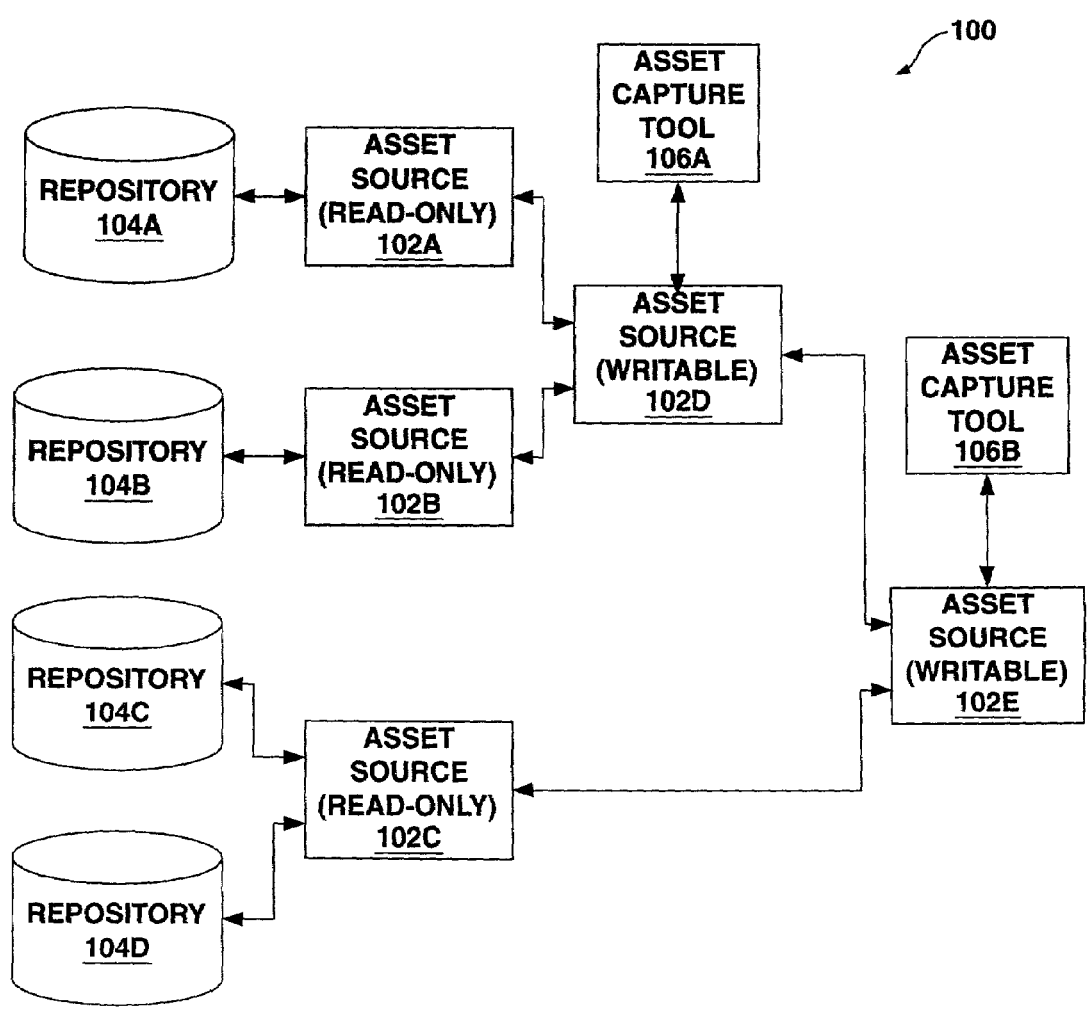
FIG. 5 is a block diagram illustrating an asset source hierarchy.

FIG. 5 is a block diagram illustrating exemplary an asset source hierarchy 100 in which asset sources 102A–102E (herein asset sources 102) are coupled to repositories 104A–D. As illustrated, asset sources 102 need not have a one-to-one relationship with repositories 104, and may be hierarchically arranged to provide multiple abstract levels as assets are captured and published. Hierarchy 100 is illustrated for exemplary purposes. Accordingly, asset sources 102 may be hierarchically arranged as required to capture assets from a wide-variety of environments.

For example, asset sources 102A–102C are coupled to repositories 104, and form a first layer of asset source hierarchy 100. More specifically, asset source 102A is configured to generate assets based on artifacts stored within repository 104A. Similarly, asset source 102B is configured to generate assets based on artifacts stored within repository 104B. Asset source 102C is configured to generate assets based on artifacts storied within repository 104C and repository 104D. In other words, asset source 102C monitors both repository 104C and repository 104D, and generates assets based on new or updated artifacts.

In the illustrated example hierarchy 100, asset sources 102A–102C comprise read-only asset sources, and publish assets to upper levels of asset source hierarchy 100 without invoking a capture tool. Accordingly, asset sources 102A–102C need not support writeable interfaces.

Asset source 102D receives and aggregates assets from asset sources 102A, 102B. In particular, asset source 102D may receive incomplete assets from asset sources 102A, 102B, and may combine the artifacts, or references thereto, of the received assets to form aggregate assets. Asset source 102D may invoke asset capture tool 106A to augment or reconcile the aggregate assets.

Similarly, asset source 102E receives and aggregates assets from asset sources 102C, 102D, and may invoke asset capture tool 106B to augment or reconcile the aggregate assets. Accordingly, the aggregate assets produced by asset source 102E should be complete, and in a state for publishing to asset library 36. Alternatively, asset sources 102D, 102E, for example, may treat assets from each of sources 102A, 102B, 102C as independent assets for publishing to asset library 36.

Figure 6:
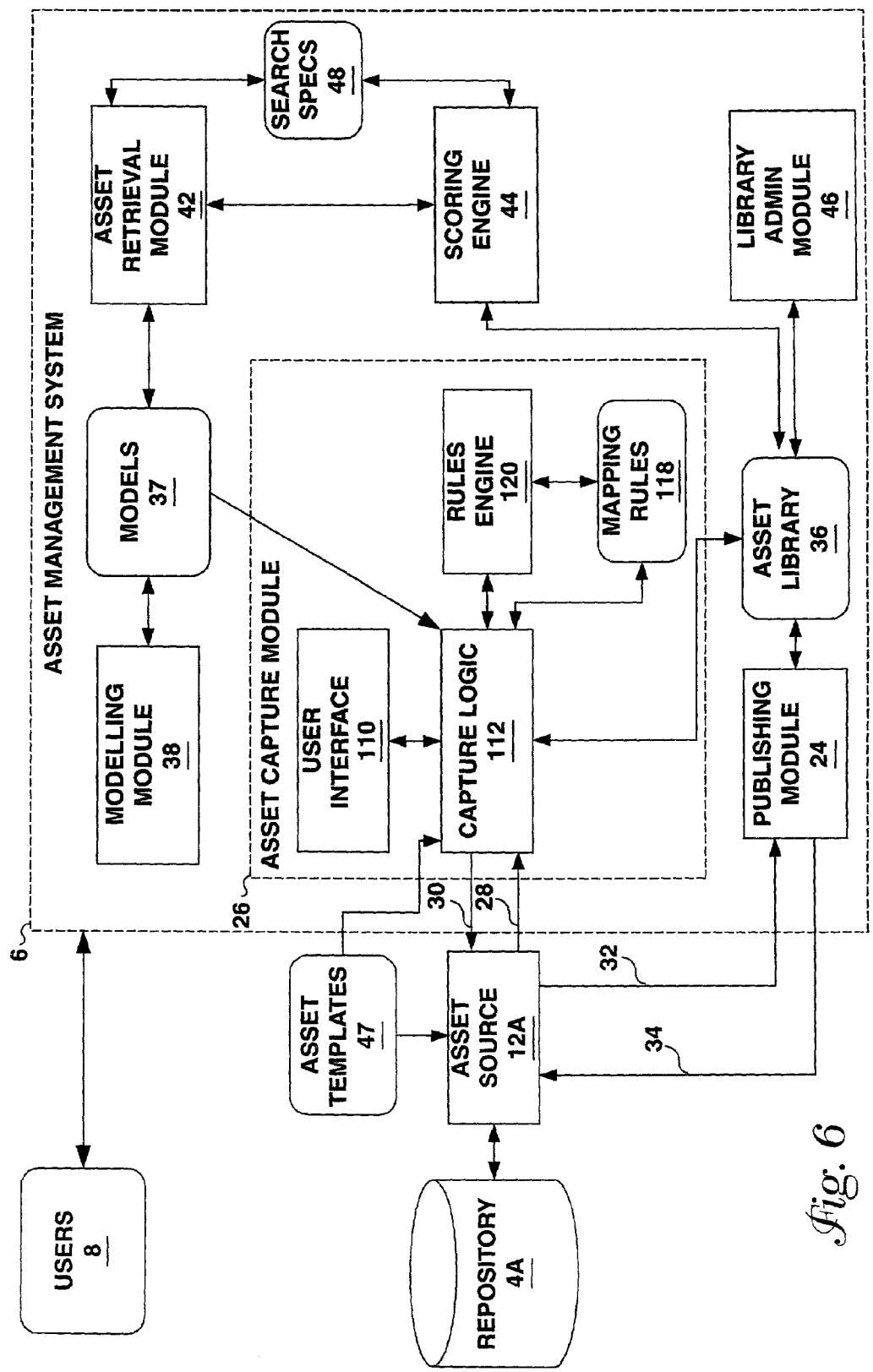
FIG. 6 is a block diagram illustrating in further detail one embodiment of an asset capture module of the asset management system

FIG. 6 is a block diagram illustrating in further detail one embodiment of asset capture module 26 of asset management system 6. For manual or semi-automated generation of assets, users 8 interact with user interface 110 to provide additional asset information, or reconcile the current artifacts captured by asset source 12A from repository 4A. Capture logic 112 drives user interface 110 to interact with users 8 according to asset schemas defined by asset templates 47. In this manner, asset capture module 26 offers users 8 and library administrator 48 (FIG. 2) the flexibility of changing asset capture workflow, as well as the structure and content of the captured assets, by change asset templates 47.

During the process, capture logic 112 maps the artifacts of the asset produced by asset source 12A to searchable elements of models 37. In particular, capture logic 112 makes use of rules engine 120 to map the metadata and artifact data of the generated assets to elements of models 37. During the asset generation process, capture logic 112 allows users 8 or a library administrator 48 (FIG. 2) to dynamically define and modify mapping rules 118 to customize the mapping process. In one embodiment, rules engine 120 may comprise a Java-based rules engine, such as JRules™ from ILOG Incorporated of Paris, France. Other embodiments may implement the mapping process through other techniques, e.g., hardcoded procedural logic.

Figure 7:
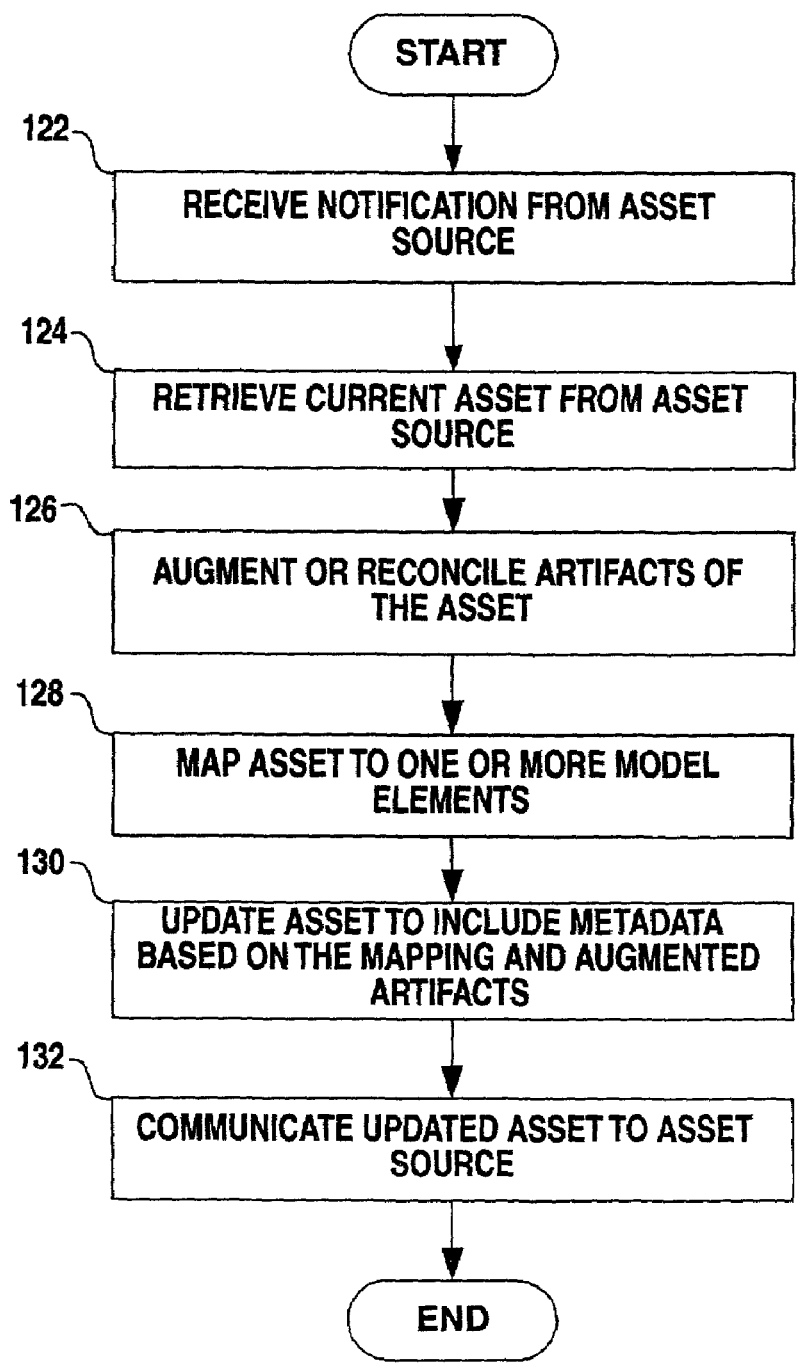
FIG. 7 is a flowchart further illustrating an example mode of operation of the asset capture module.

FIG. 7 is a flowchart further illustrating an example mode of operation of asset capture module 26. Initially, capture logic 112 receives notification 28 from asset source 12A indicating an asset within staging area 58 has been generated and is ready for editing (122). In response, capture logic 112 retrieves the current asset from asset source 12A (124), and augments or reconciles the artifacts of the current asset (126). Based on asset templates 47, as described above, capture logic 112 may drive user interface 110 to capture the required information from users 8. Alternatively, capture logic 112 may invoke one or more scripts or other components to automate the process.

Next, capture logic 112 maps the asset to one or more model elements of models 37 (128). Capture logic 112 may, for example, invoke rules engine 120 to perform the mapping based on mapping rules 118. In addition, capture logic 112 may drive user interface 110 to map the assets to model elements based on input from users 8. In this manner, capture logic 112 builds associations between generated assets and the elements of models 37. Assets may be associated with, for example, interfaces, components, functions, case steps, and other elements that may be described within models 37.

Next, capture logic 112 updates the asset to include additional metadata based on the developed mapping, as well as any additional artifacts and other metadata that may have been provided by users 8 or automated scripts. (130). Finally, capture logic 112 communicates the updated asset to asset source 12A for storage in staging area 58 (132).

Figure 8:
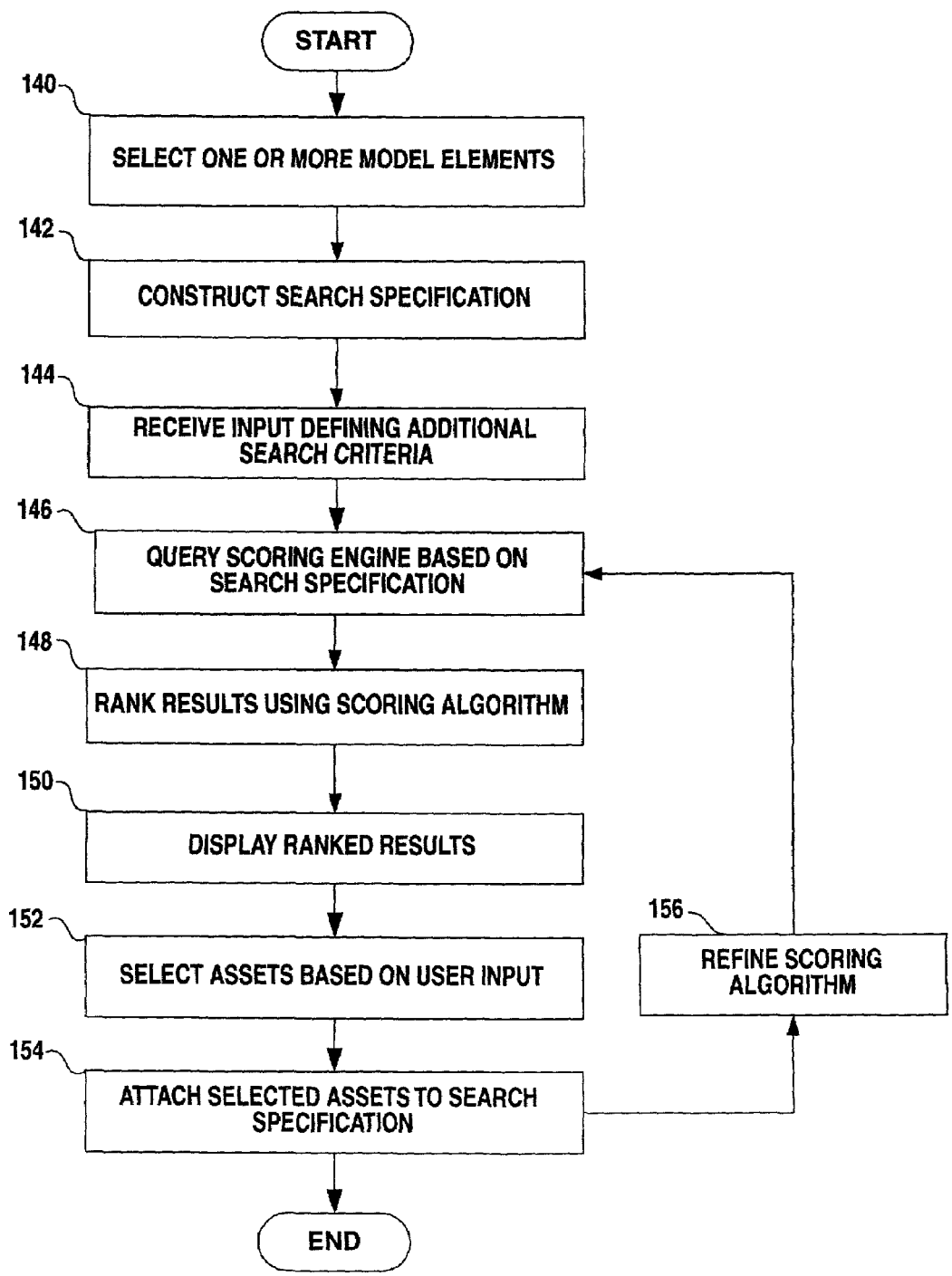
FIG. 8 is a flowchart illustrating an example of retrieving reusable assets from the asset management system.

FIG. 8 is a flowchart illustrating an example operation of retrieving reusable assets from asset management system 6. In response to input from one of users 8, asset retrieval module 42 selects one or more elements of models 37 (140) and constructs a model-based search specification 48 (142). The user may, for example, graphically view one or more of models 37, and identify elements, such as interfaces, components, functions, case steps, and the like, for inclusion within the search specification. In addition, asset retrieval module 42 may receive additional search criteria, such as keywords and other classifiers including an operating system, license type or language, for inclusion within the search specification 48 (144).

Next, asset retrieval module 42 directs scoring engine 44 to search asset library 36 in accordance with the search specification 48 (146). Based on the search specification, scoring engine 44 ranks the assets within asset library 36 using a scoring algorithm that determines, for example, how closely each asset satisfies the criteria of the search specification 48 (148).

Asset retrieval module 42 displays to the user the ranked assets found within asset library 36 by scoring engine 44 (150), and selects one or more of the assets in response to user input (152). Based on user request, asset retrieval module 42 attaches the selected assets to the search specification 48 (154). In this fashion, the user can selectively retain the assets for a software project. In one embodiment, scoring engine adaptively updates the search specification 48 based on the assets attached by the user, thereby dynamically refining scoring algorithm (156).

Domain Reference Model

The asset capture and identification tools of the invention allow resources to be mapped to a domain reference model (DRM). The DRM may be built in commercially available standalone software, such as Rational Rose, available from Rational Software of Lexington, Mass., or may be directly integrated as a part of a standalone tool.

A DRM identifies both atomic and higher-level tasks or process elements. Preferably, these elements are organized in two different models. The first model is the structural model, which is similar in organization to a library of code components. Each reference component in the structural model contains one or more functions applicable to the domain. These functions may be organized in intermediate groupings called interfaces that associate functions according to expect usage patterns or other criteria. However, the components defined in the structural model are not actually implemented as executable code, but simply serve as a reference model of possible functions within the domain.

The second model is generally a business process model, which identifies higher-level areas within the domain and breaks them into processes and subprocesses. At the atomic level, the processes are broken down to "use cases," which detail the necessary steps of a particular task. These steps are associated with the components, interfaces, and functions in the structural model, and may be repeated in different combinations in the various use cases. The model need not be organized around a business structure, but may comprise any appropriate topical organization (e.g., a technical reference architecture for software component implementation and deployment).

Figure 9:
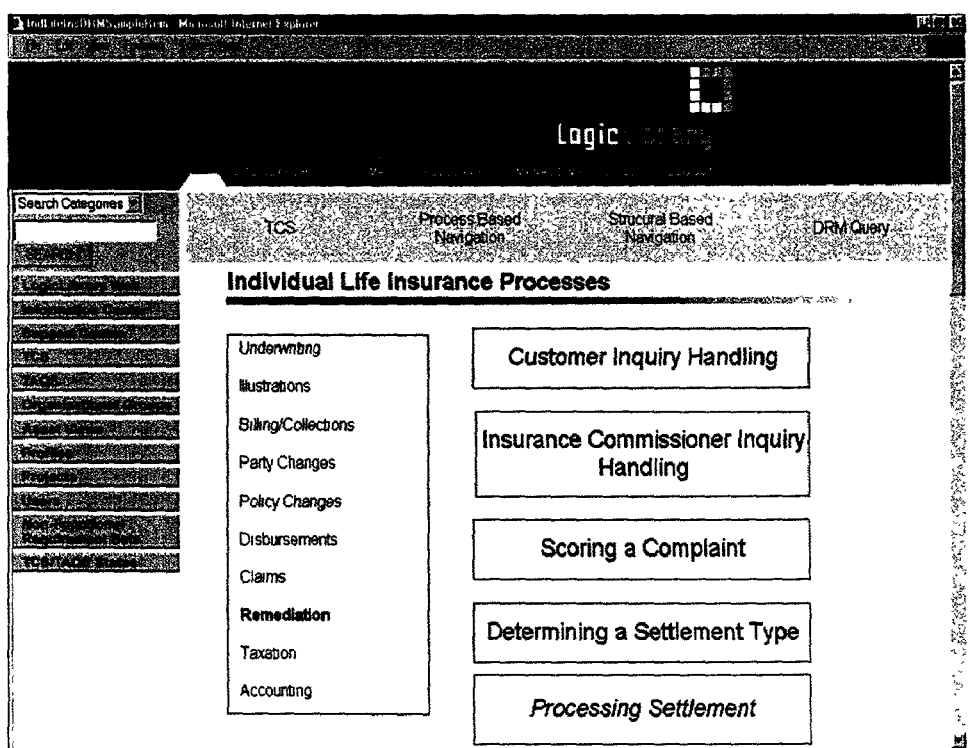
FIG. 9 is a top-level diagram of an insurance domain reference model (DRM).
Figure 10:
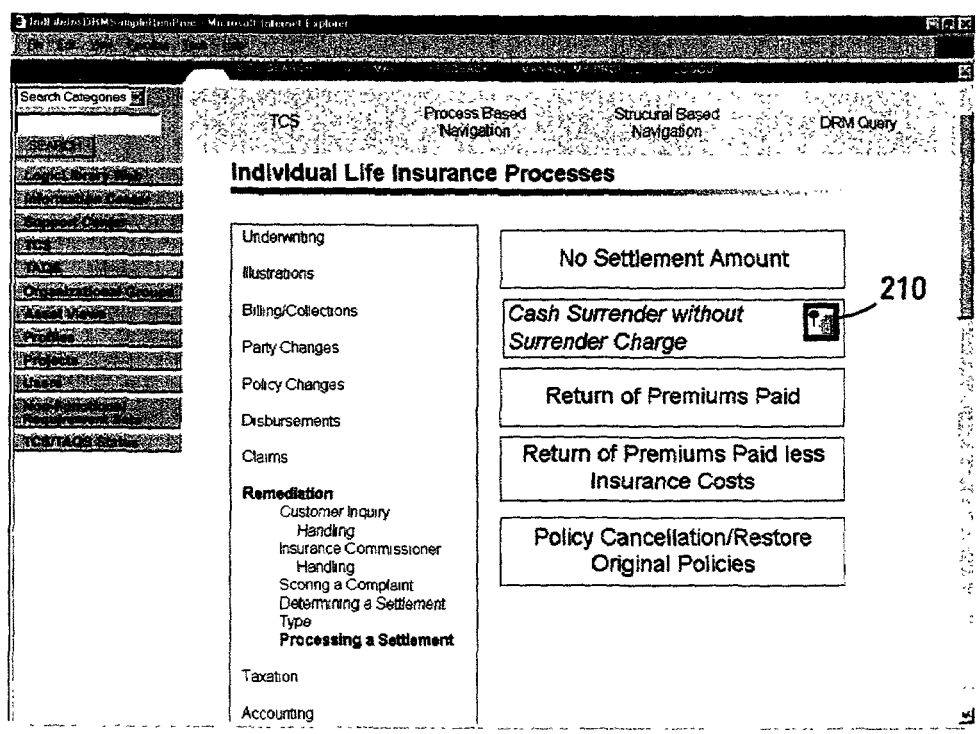
FIG. 10 is an expansion of the Remediation category of the DRM of FIG. 9.

The business-process side of a DRM for the insurance industry is shown in FIGS. 9–12. FIG. 9 shows a top-level categorization of life insurance processes, organized into the categories Underwriting, Illustrations, Billing/Collections, Party Changes, Policy Changes, Disbursements, Claims, Remediation, Taxation, and Accounting. As shown, Remediation has been selected, and subcategories of remediation processes are shown at right, including Customer Inquiry Handling, Insurance Commissioner Inquiry Handling, Scoring a Complaint, Determining a Settlement Type, and Processing Settlement. As shown in FIG. 10, if Processing Settlement is selected, additional subtopics No Settlement Amount, Cash Surrender without Surrender Charge, Return of Premiums Paid, Return of Premiums Paid Less Insurance Costs, and Policy Cancellation/Restore Original Policies. As indicated by icon 210, Cash Surrender without Surrender Charge is a lowest-level process, which has an associated set of use cases. Cross-branching may also be allowed, wherein certain subprocesses appear in more than one process.

The set of use cases represent a series of steps making up an algorithm for executing the associated subprocess. For the Cash Surrender without Surrender Charge, a portion of the associated set of use cases is shown in graphical form in FIG. 11. The use case diagram may indicate responsible personnel (settlement clerk 212) as well as individual use cases (the algorithm steps).

Figure 12:
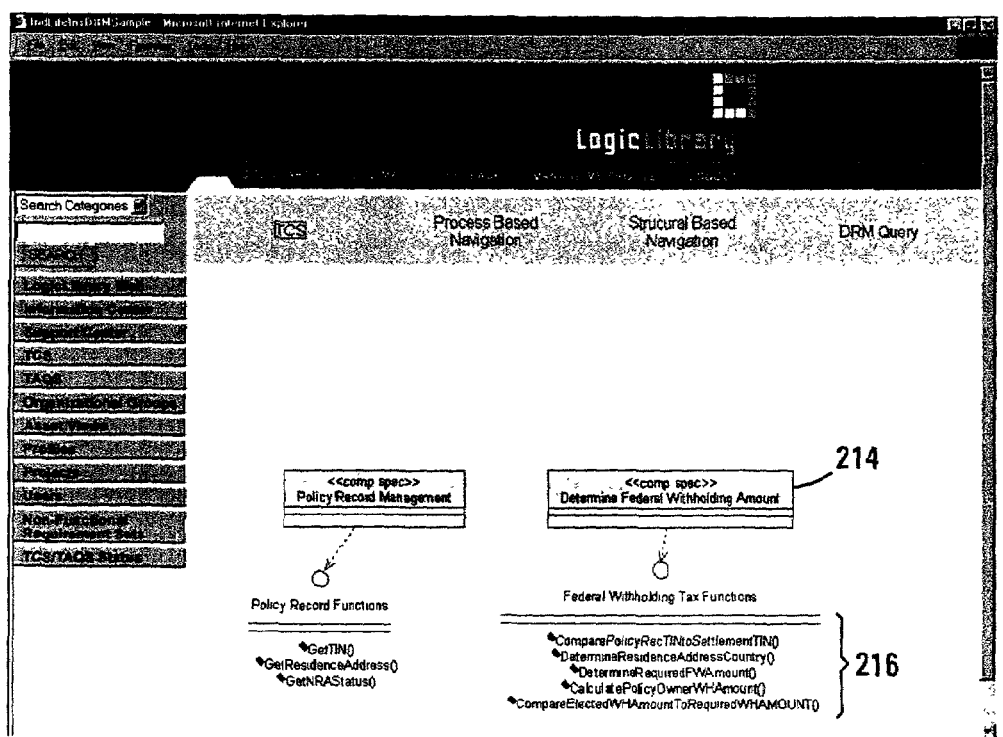
FIG. 12 shows functions identified as part of a step of the use case of FIG. 11.

FIG. 12 shows a portion of the structural form of the functions associated with the use case "Determine Federal Withholding Amount." The reference component Determine Federal Withholding Amount 214 includes five functions 216 grouped into one interface that may be performed (e.g., by subroutines) in connection with determination of federal withholding: ComparePolicyRegTINtoSettlementTIN( ), DetermineResidenceAddressCountry( ), DetermineRequiredFWAmount( ), CalculatePolicyOwnerWHAmount( ), and CompareElectedWHAmounttoRequiredWHAmount( ).

In addition, three Policy Record Functions, also grouped into a single interface, are required for this use case: GetTIN( ), GetResidenceAddress( ), and GetNRAStatus( ). Some of the functions may be specific to the use case and appear only in that case (e.g., DetermineRequiredFWAmount( )), while others are generic and appear in a number of cases (e.g., GetResidenceAddress( )). In addition, expected variable types (e.g., a CurrencyValue type that includes both a decimal amount and a string currency identifier) may also be specified in the model.

Asset Capture Tool

The asset capture module 26 illustrated in FIG. 2, referred to below as the asset capture tool, is used to catalogue resources by constructing a metadata document for placement into an asset library ("publishing" the asset). Individual data types and functions from the asset are mapped to the domain reference model (or to multiple models), and the mappings are saved as metadata for later searching to identify usable assets for new projects. In preferred embodiments of the invention, additional information may be included such as comments on the quality of the mapping, details of the asset characteristics such as language and licensing arrangements, or structural diagrams of the asset.

The asset capture process according to one embodiment of the invention is illustrated in FIGS. 13–25. The menu 240 shows the steps of the workflow process. Log 242 creates a running record of asset acquisition. The log window preferably remains throughout the asset capture process, but has been omitted from subsequent figures in order to conserve space.

Initially, the user configures the asset capture tool, setting options for the acquisition process such as the level of detail to be saved in the log, the group of DRMs to be used in the mapping process, and the schema and target repository for storing information.

Figure 13:
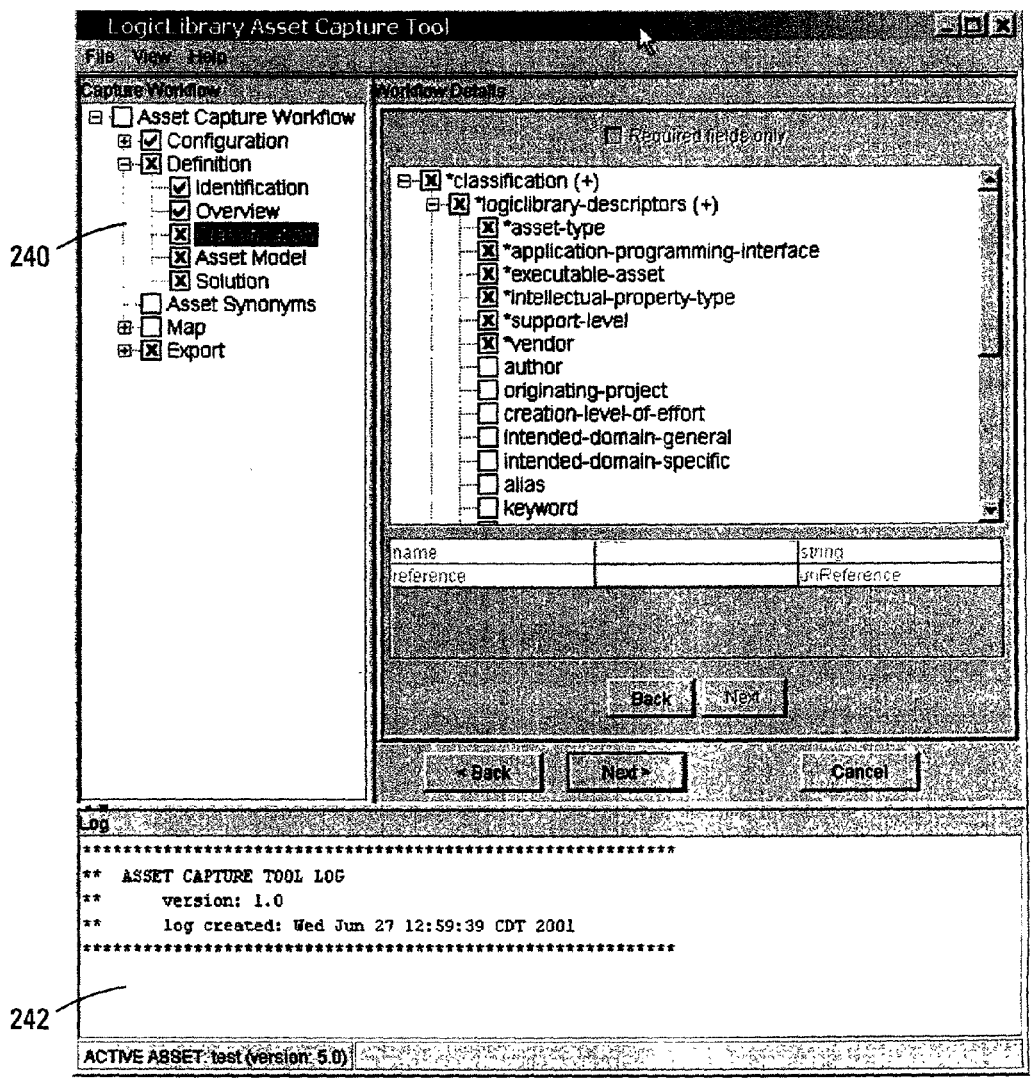
FIG. 13 is a window showing Classification according to one embodiment of the invention.

The user then proceeds to the definition stage. The asset to be added to the library is located, and general information about the asset is entered in the overview section. FIG. 13 shows the classification step. Using the data entry box 244, the user specifies values for descriptors relating to the asset as a whole. In the embodiment shown, required descriptors are marked with an asterisk; a value for these descriptors must be entered before the user can proceed with publication of the asset. The descriptors shown in FIG. 13 represent nonlimiting examples of the types of information that may be stored about the asset. A standard set of descriptors is preferably provided as part of the schema set in the configuration step, which may include any information relevant to a person deciding whether to use the asset, including descriptions of the asset itself and associated information such as licensing options. The user may also add one or more additional descriptors at this stage. These descriptors will not be added to the schema for other assets, but will be included in the metadata pertaining to the asset being added to the database.

Figure 14:
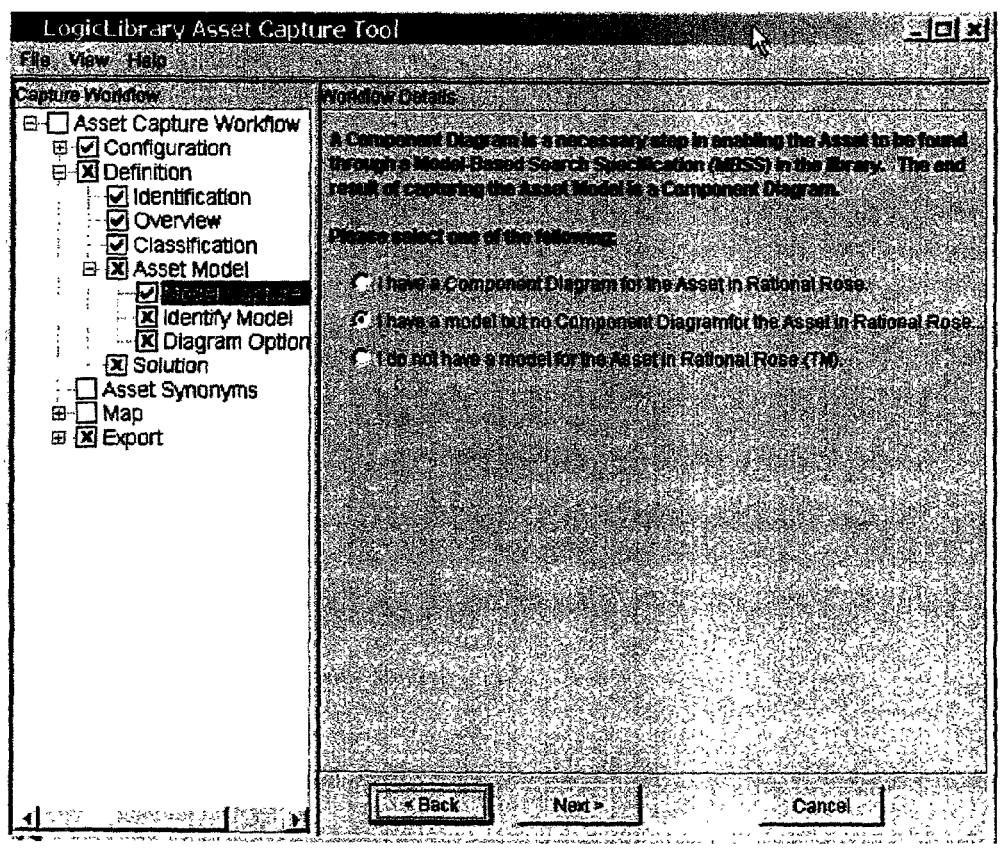
FIG. 14 is a window showing Model Capture.

Once the classification step has been completed, the user specifies the asset model and component diagram that will be used to catalogue the asset. If an asset model and/or a component diagram do not yet exist, the asset capture tool will preferably give the user the option to create them, as shown in FIG. 14.

Figure 15:
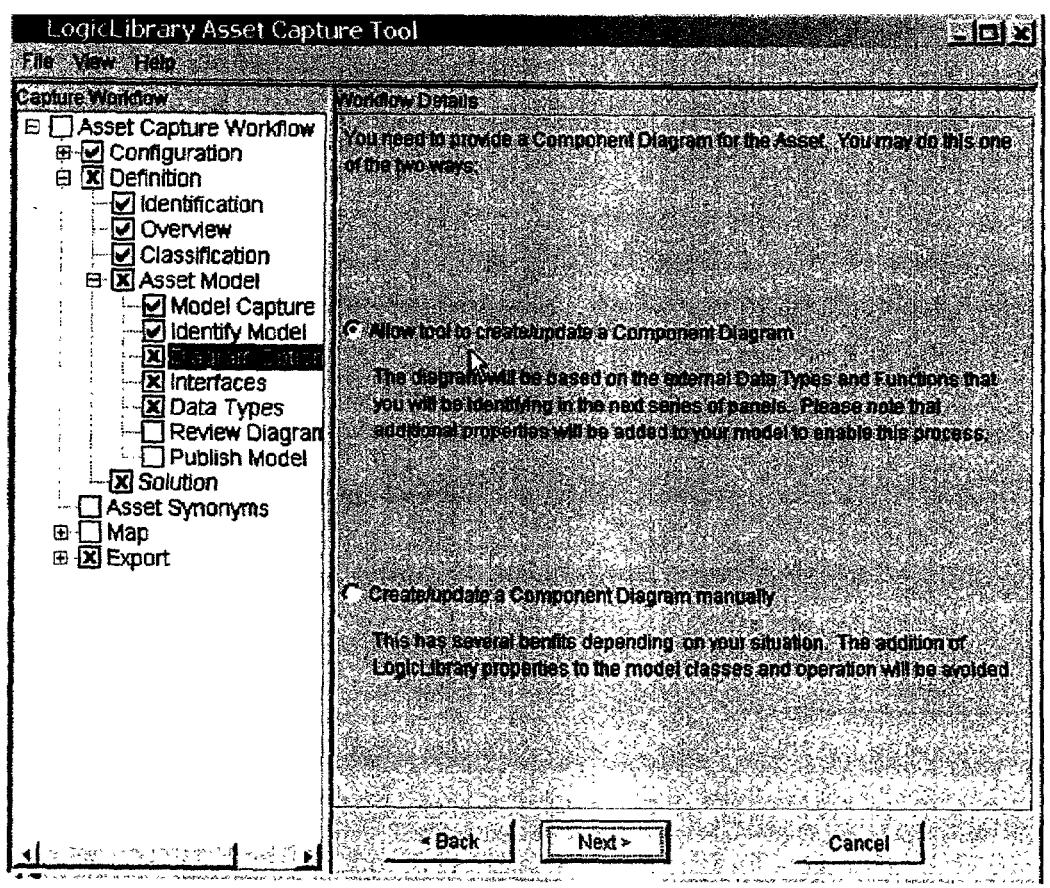
FIG. 15 is a window showing selection of Diagram options.

As part of the asset capture process, a component interface diagram will be created for the asset (unless one already exists). Preferably, the asset capture tool will be able to create or update the component diagram either automatically or manually, and will offer the user a choice of either procedure, as shown in FIG. 15. However, systems that provide only manual or only automatic means for building the component diagram also fall within the scope of the invention. The following description pertains primarily to automatic methods of generating the component diagram. However, any "manual" method that produces a component interface diagram compatible with the asset capture tool (preferably conforming to the Unified Modeling Language standard) is considered to be within the scope of the invention.

Figure 16:
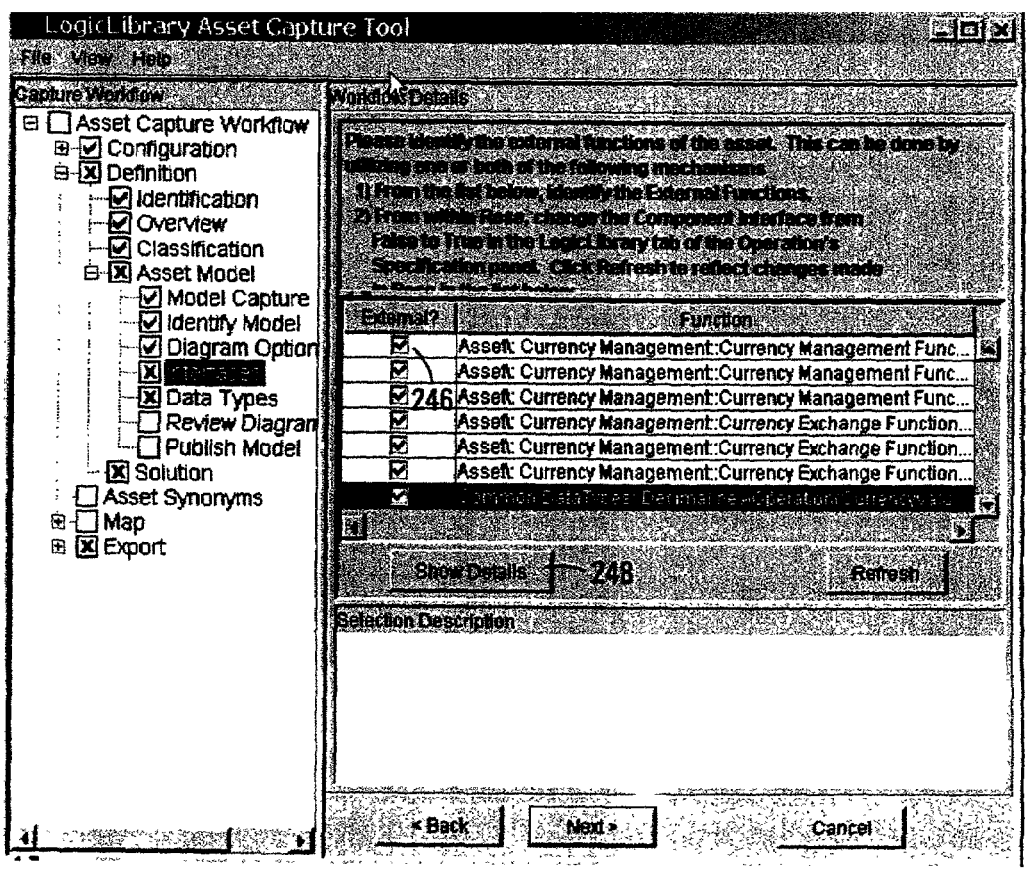
FIG. 16 is a window showing capture of an asset Interface.

To automatically generate the component interface diagram, the asset capture tool first identifies functions within the asset, and preferably allows the user to specify which functions are external, as shown in FIG. 16. The asset shown includes a collection of functions used for management of different currencies (for example, functions for determining exchange rates). Checkboxes 246 are used to identify functions that are intended to be accessible to a developer using the resource, e.g., functions and data types that are part of the API for the asset. Preferably, the user can view asset documentation for the functions, for example via a Show Details button 248.

Figure 17:
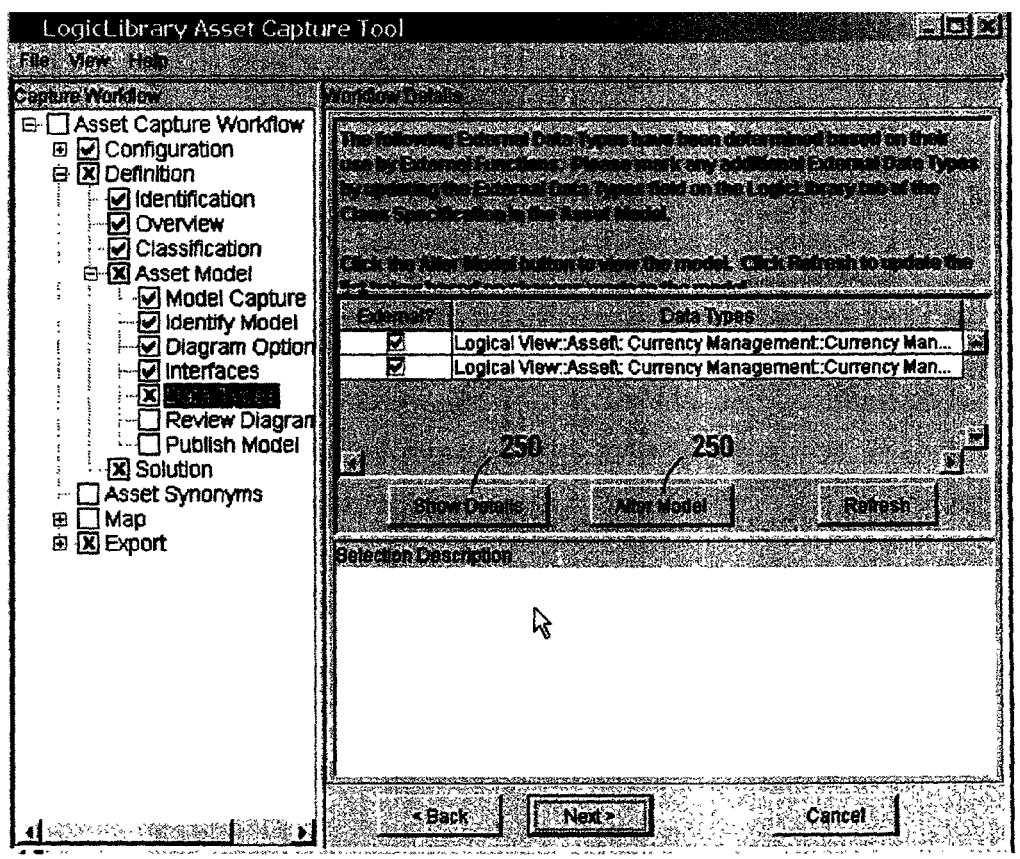
FIG. 17 is a window showing identification of external Data Types.

As shown in FIG. 17, the asset capture tool next identifies any custom data types used by the external functions of the asset, and allows the user to select any additional data types that are part of the API for the asset. (Standard "primitive" data types such as integers and Boolean variables are preferably not presented at this stage, although they are taken into account in later steps of the asset capture process). Again, details on the data types may be viewed, and the structural model may be adjusted, via buttons 250. For example, a collection of primitive data types making up a compound type may be viewed (e.g., a CurrencyValue type that includes both a decimal amount and a string identifying the currency).

Figure 18:
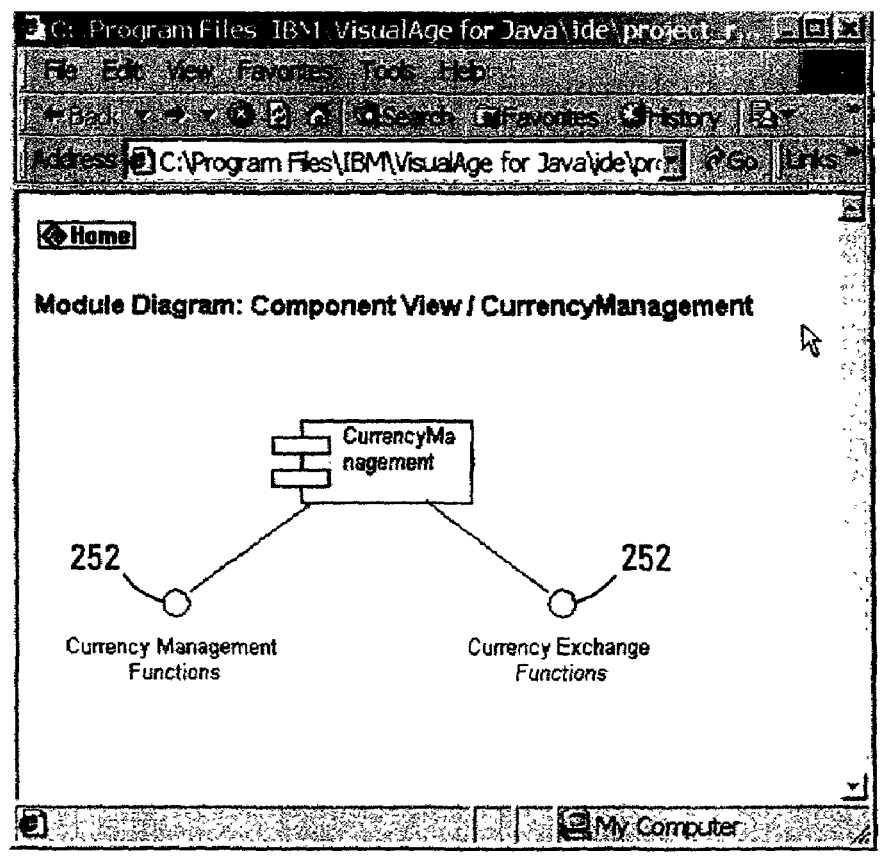
FIG. 18 is a window showing an interface diagram for a Currency Management asset.

The data on external functions and data types is used to generate an interface diagram, typically using an external tool such as Rational Rose. A generated interface diagram for the currency management asset is shown in FIG. 18. The diagram shows the selected external interfaces 252 presented by the CurrencyManagement component. Additional information about the functions may be accessed through the illustrated graphical user interface (GUI). After reviewing the diagram, the user is preferably given the option to "publish" the diagram. In one embodiment of the invention, the diagram is saved as an HTML document, which is added to the metadata for the asset. The HTML document is available to a later user who finds the asset in the database, so that he can better evaluate its suitability for the task at hand, even if he does not have Rational Rose or a similar external tool installed on his machine.

Figure 19:
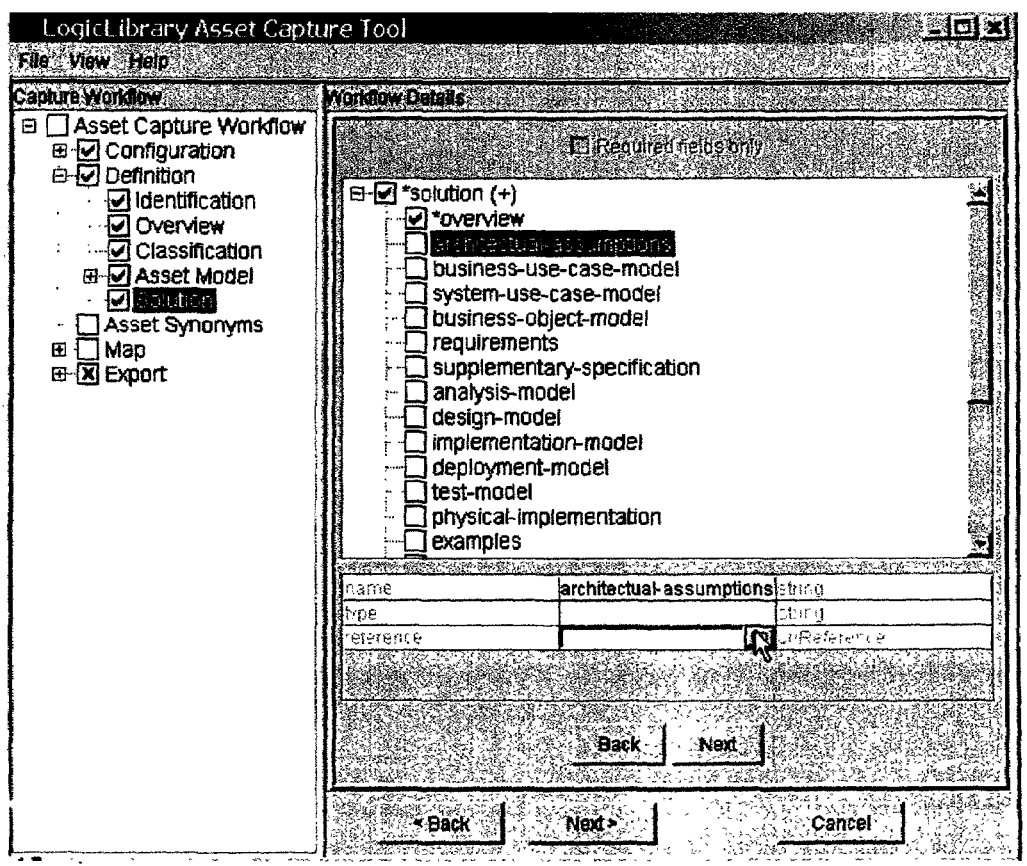
FIG. 19 is a window showing entry of artifacts for an asset.

In the final step of the asset definition phase, other descriptive elements of the asset (referred to herein as "artifacts" of the asset) such as its architectural assumptions, examples, warranty, and reviews may be specified, as shown in FIG. 19. Preferably these artifacts may be specified by value (where a copy of the artifact is made for later publication as part of the asset into the asset library), by reference (where a URL or other form of file reference is documented as part of the asset), or by description (where a text field documents the (typically physical) location of the artifact). Artifacts may include both functional and nonfunctional characteristics of the asset. Nonfunctional characteristics are distinct from the functional characteristics that are mapped against the DRM. In preferred embodiments, both nonfunctional and functional characteristics can be searched.

Figure 20:
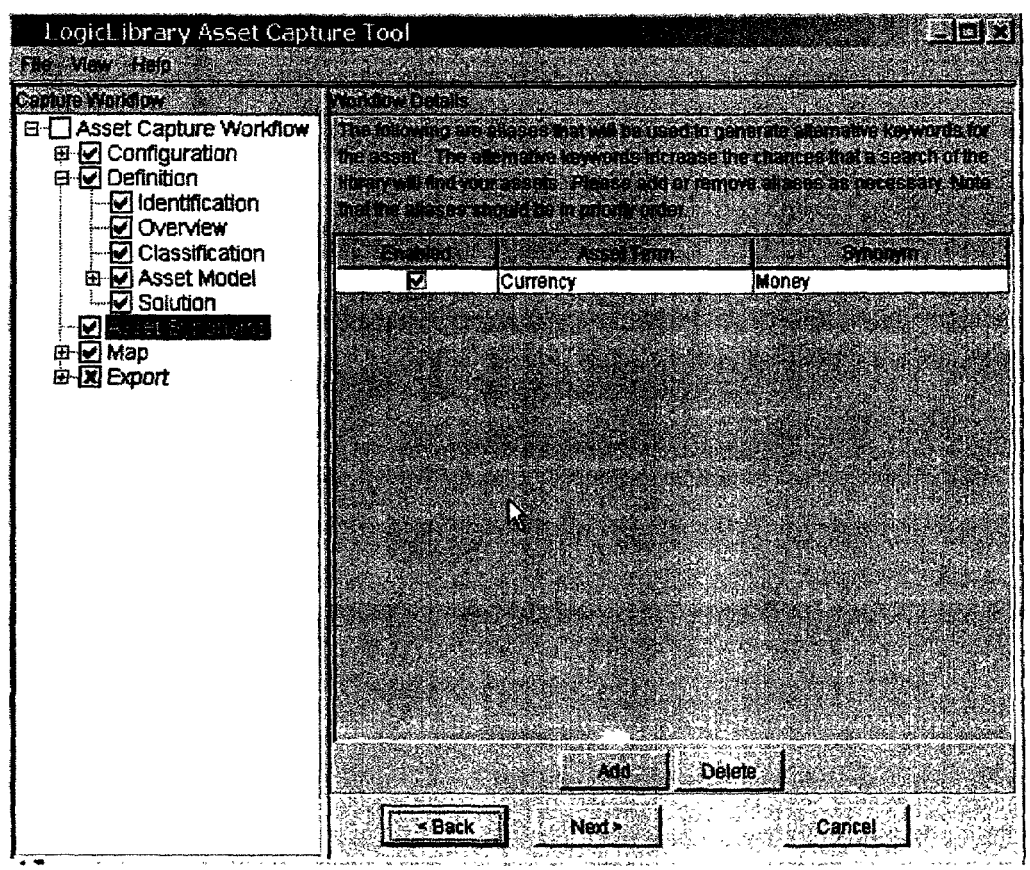
FIG. 20 is a window showing entry of Asset Synonyms.

After the asset definition phase has been completed, synonyms for the asset may be defined, as shown in FIG. 20. These synonyms are designed to improve the quality of searches by associating words used in the asset functions and descriptions with likely synonymous search words. For example, if an asset routinely uses "schedule" internally to refer to a collection of insurance rates, it may be desirable to associate "schedule" with "rates" to improve the probability of appropriate functions being displayed during a search for functions handling insurance rates. As will be described in more detail in connection with searches, one system according to the invention uses substring substitution of synonyms to improve search quality. More complicated semantic analysis in view of defined synonyms may also be used and falls within the scope of the invention.

Figure 21:
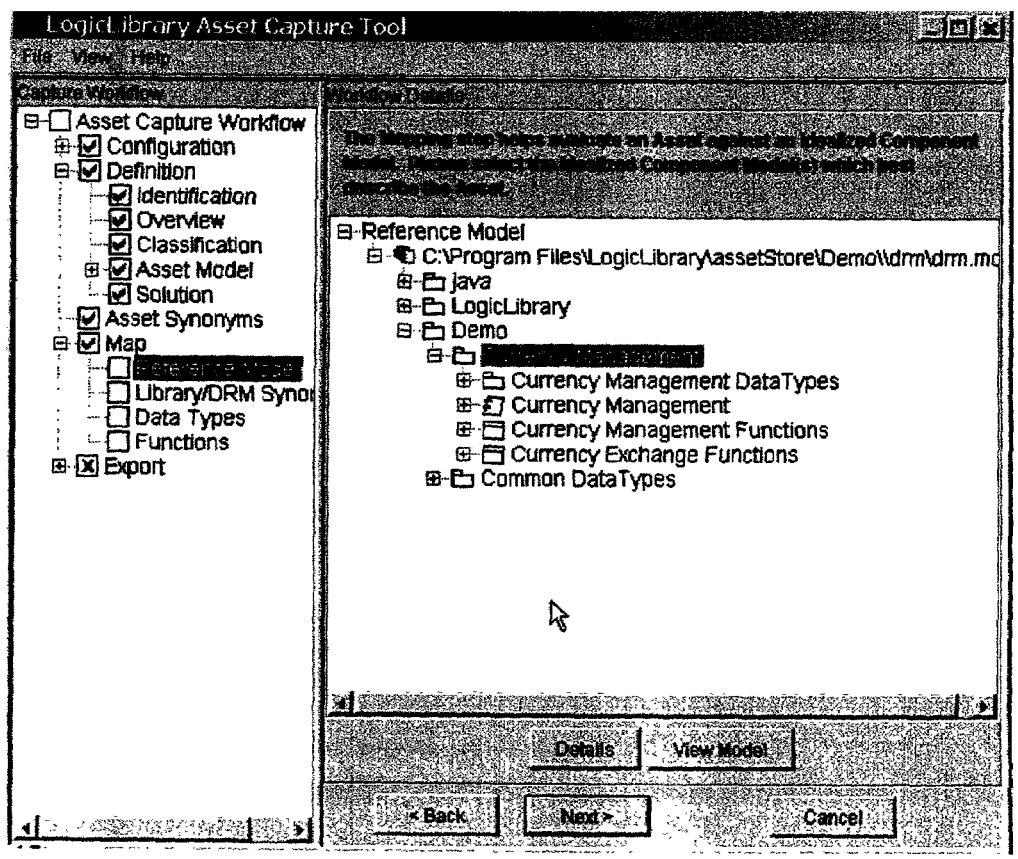
FIG. 21 is a window showing selection of a Reference Model.

After definition of asset-specific synonyms, the user maps the asset to one or more DRMs contained within the group of models selected during the configuration step. The reference model is selected, as shown in FIG. 21. In the embodiment shown, only one reference model may be selected, but multiple portions of that model may be run simultaneously. In other embodiments, multiple DRMs may be selected to run either simultaneously or sequentially. In FIG. 21, the Currency Management model includes both management functions and exchange functions. If the user knows that only management functions are performed by the asset, he may select only that portion of the model for mapping. If both management and exchange functions are performed, or if the user is not certain of the full scope of functions performed, all parts of the model may be used.

Figure 22:
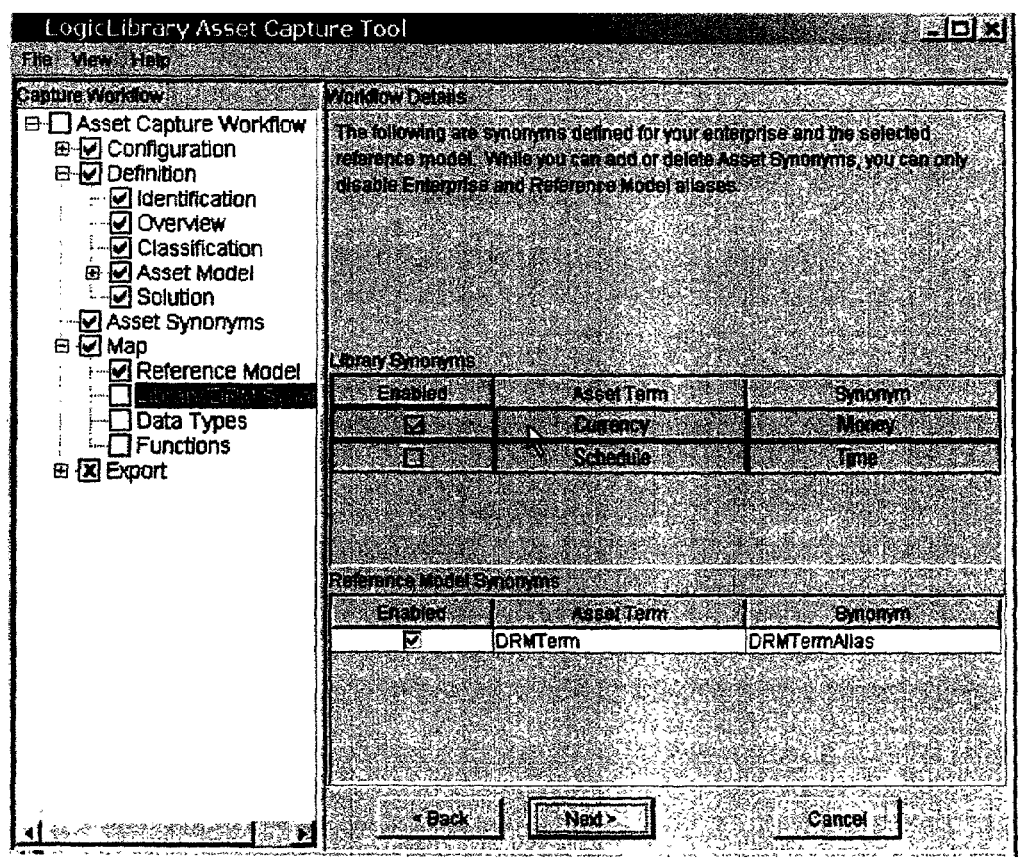
FIG. 22 is a window showing Synonyms for the DRM and Library.

The user may view synonyms that have been defined for the DRM or on an enterprise-wide basis, as shown in FIG. 22. In the embodiment shown, the user cannot add synonyms to the DRM or to the library as a whole, but has the option to enable or disable certain synonyms. This feature is particularly useful for words that may have multiple meanings. For example, "money" is enabled as a synonym for "currency." However, if the user knows that the asset uses the term "schedule" to mean a collection of insurance rates, he may wish to disable the synonym of "time" for "schedule."

Once the reference model and synonyms have been selected, the asset can be mapped against the DRM. In preferred embodiments, the mapping begins with data types and proceeds through functions, working from the least to the most complex. By using information from earlier mappings, the quality of automatic suggestions for mapping can be improved.

Figure 23:
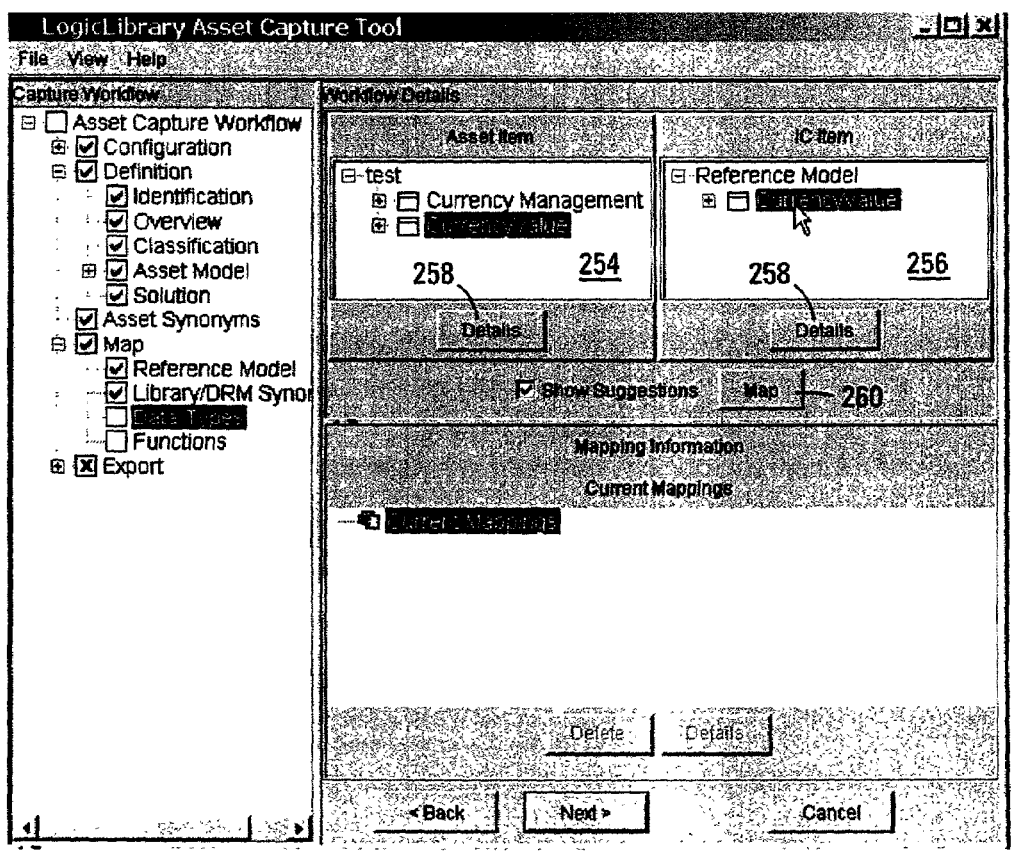
FIG. 23 is a window showing Datatype mapping.

FIG. 23 shows the first step in mapping data types. The custom data type CurrencyValue exists in the asset, as shown in left panel 254. When CurrencyValue is selected, the reference model is searched, using substring substitution for known synonyms, and one or more suggested model datatypes are displayed in right panel 256. In order to select the best match, details for either the asset datatype or the model datatype can be accessed via the Details buttons 258.

Figure 24:
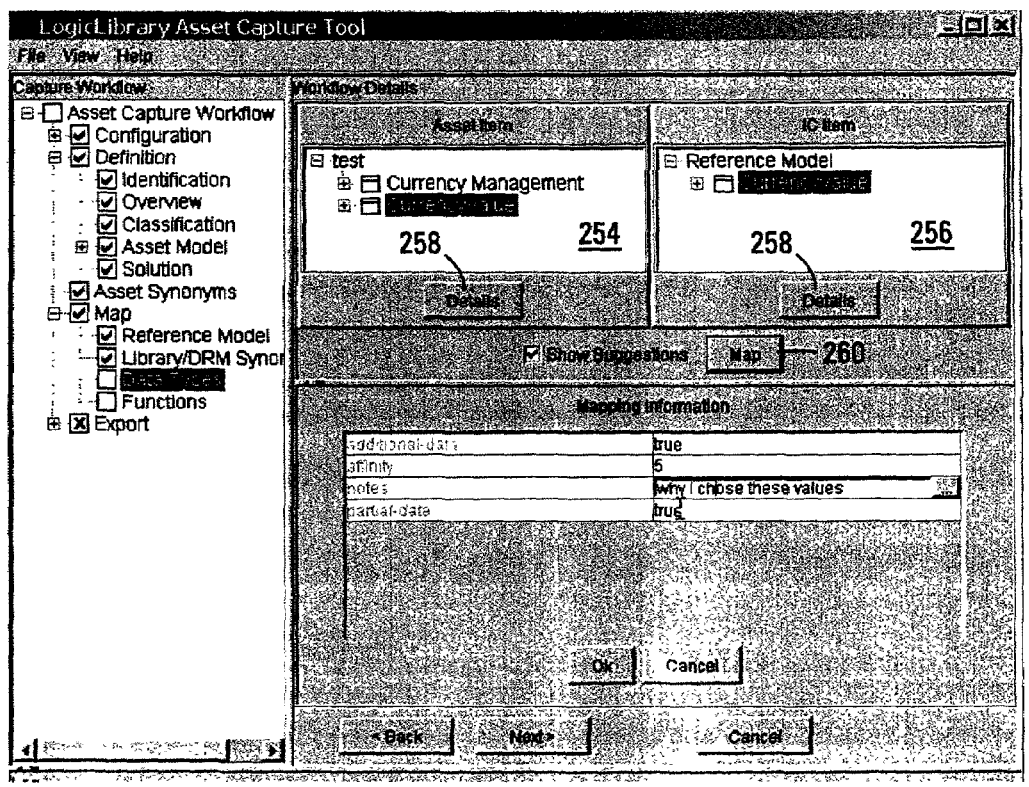
FIG. 24 is a window showing entry of descriptors of mapping quality.
Figure 25:
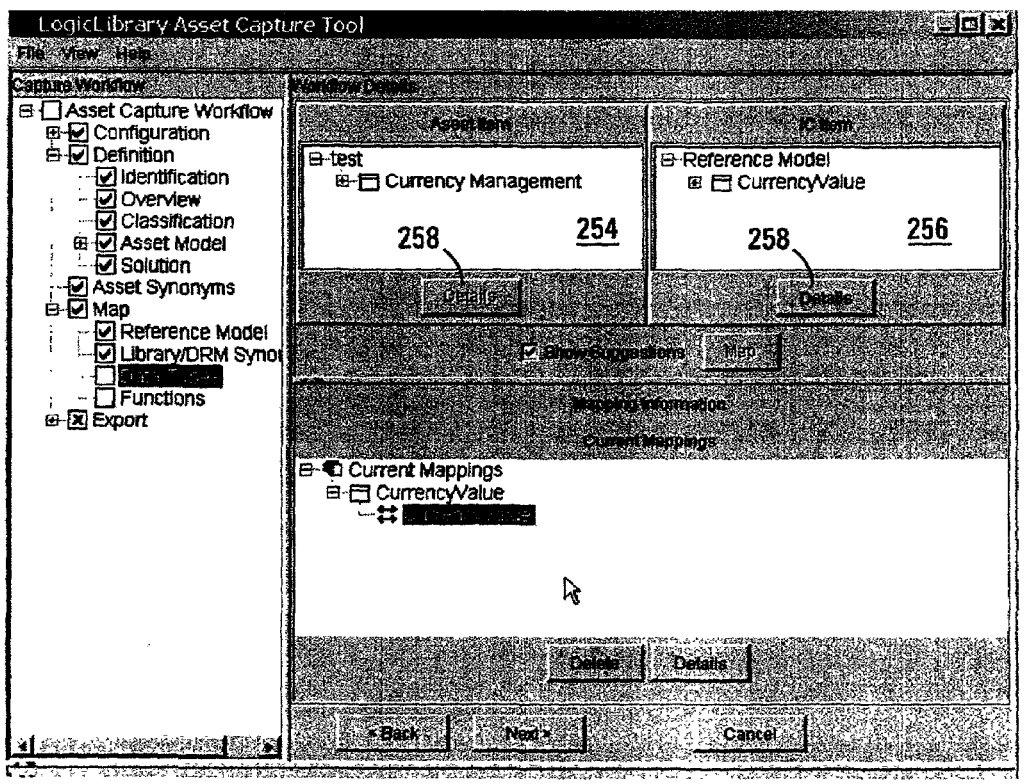
FIG. 25 is a window showing a completed Datatype mapping.

FIG. 24 shows the system after a suggested datatype has been selected. Four descriptors have been provided to describe the quality of the mapping. Boolean types additional-data and partial-data allow the user to specify whether the asset datatype contains more or less information than the model datatype. In addition, the quality of the matching can be stored in the affinity field, and a notes field allows the user to describe any special characteristics of the mapping. Once the user has entered values for these descriptors and clicks the Map button 260, the mapping for CurrencyValue is added to the metadata for the asset, as shown in FIG. 25. This mapping is then used to refine the quality of suggested mappings for later (generally more complex) datatypes and for functions.

The mapping process for functions proceeds in the same fashion as the mapping process for custom datatypes. The user has available the same set of descriptors for describing the quality of the mapping between available external functions that were available for mapping datatypes. By mapping datatypes first, the asset capture tool can use datatype equivalencies to select likely candidates for functional equivalencies. For example, a function called Convert( ) that takes CurrencyValue as an argument may be a more likely match in a currency exchange package than one that takes GregorianDate. Functions, like datatypes, may be mapped in a many-to-many relation, and the additional-data, partial-data, and comments fields can be used to annotate the quality and characteristics of the mapping(s).

Once all functions and datatypes have been mapped to the DRM to create the component diagram, the accumulated metadata for the asset can be uploaded to the database for searching. Any of a number of standard file formats may be used for database entries.

Model Based Search Specification

Once assets have been classified in a library database, a search engine should be provided to allow them to be accessed. While standard search engines may be used on the database described above, it is preferable to use a specialized engine designed to take maximum advantage of the unique data stored in the library.

According to one embodiment of the invention, the search engine is designed to allow construction of a search specification using either the process-based side or the structural side of a domain reference model as described above. FIGS. 9–12 and 26–30 show the process of constructing a search specification, performing a search, and interpreting the results.

Figure 11:
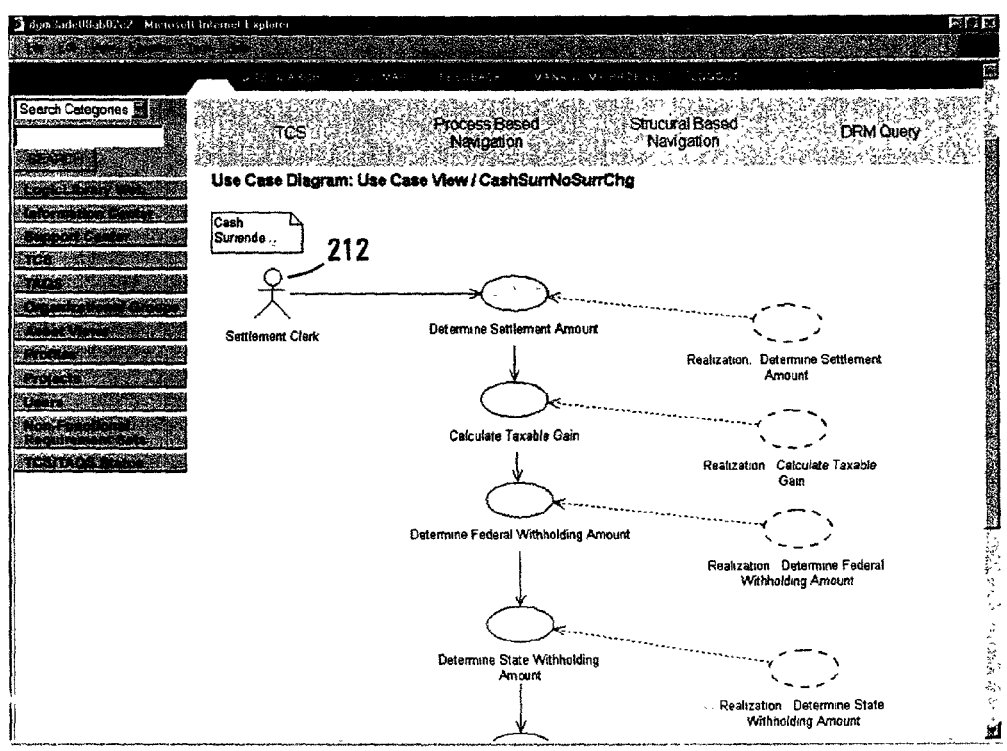
FIG. 11 shows a portion of a use case diagram from the insurance DRM.

A user unfamiliar with software development can nevertheless identify assets useful for creating a tool to solve a particular need, by navigating the business process-based side of the domain reference model shown in FIGS. 9–12. Proceeding through FIGS. 9 and 10 as described above, the user selects functions from within the DRM until he reaches a use case diagram. The use cases making up the diagram can be viewed as shown in FIG. 11. For any use case within the diagram, the user may view associated functions from the structural portion of the DRM, as shown in FIG. 12. The user then selects the desired functions from the list for addition to the search specification. Preferably, the user may be given the option to automatically select all of the functions associated with the use case, or selected blocks of functions associated with individual use case steps. The graphical user interface and drill-down through the process side of the DRM makes it easy for the user to identify all of the needed functionality, even if he is unfamiliar with the conventional process of developing technical specifications. In a preferred embodiment of the invention, the library database also provides a DRM search facility that allows users to selectively enter a DRM at any point based on query results (e.g., a keyword search for DRM elements associated with the term "currency" and preferably its synonyms), thus allowing the user to rapidly find model elements of interest.

Figure 26:
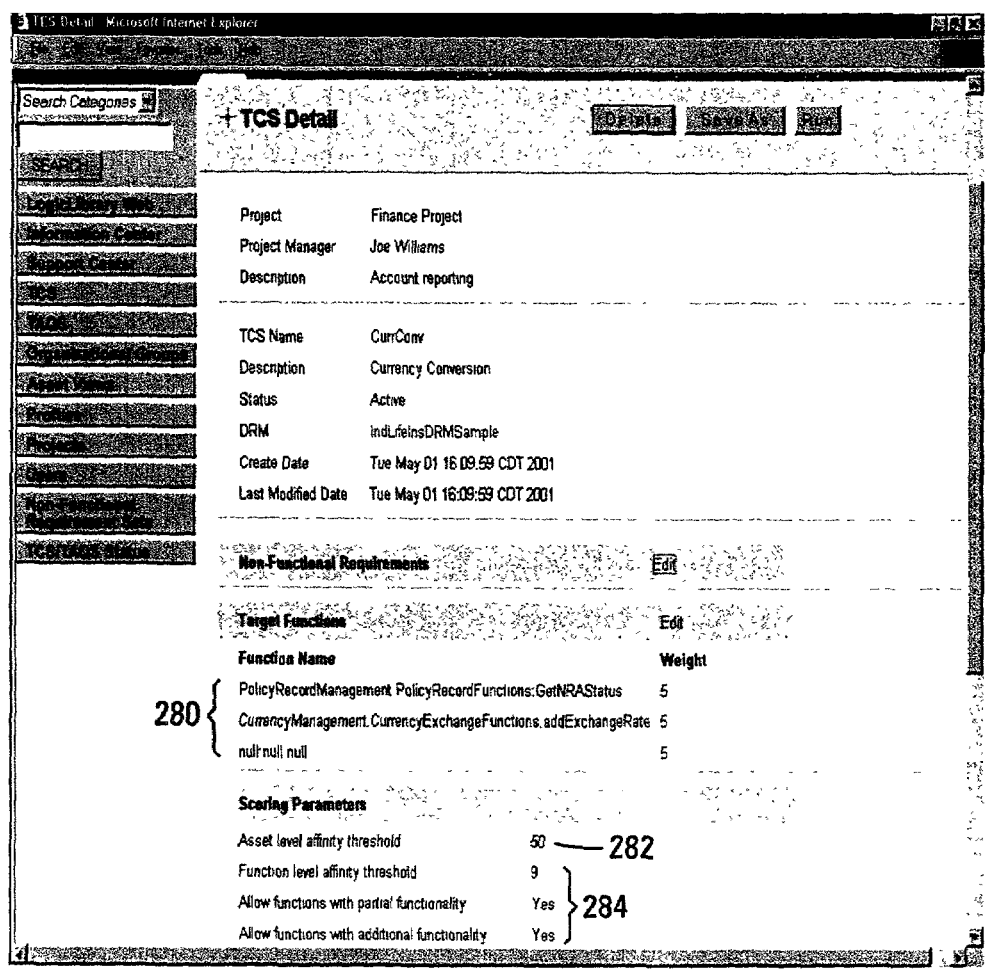
FIG. 26 is a window showing a constructed search specification using DRM functions.

A search specification constructed in this manner is shown in FIG. 26. Two functions 280 have been identified from the candidates shown in FIG. 12: GetNRAStatus from the PolicyRecordManagement functions, and addExchangeRate from the CurrencyManagement functions. In addition, the user can specify general parameters 282 and function-specific parameters 284 for how close a match is required.

Figure 27:
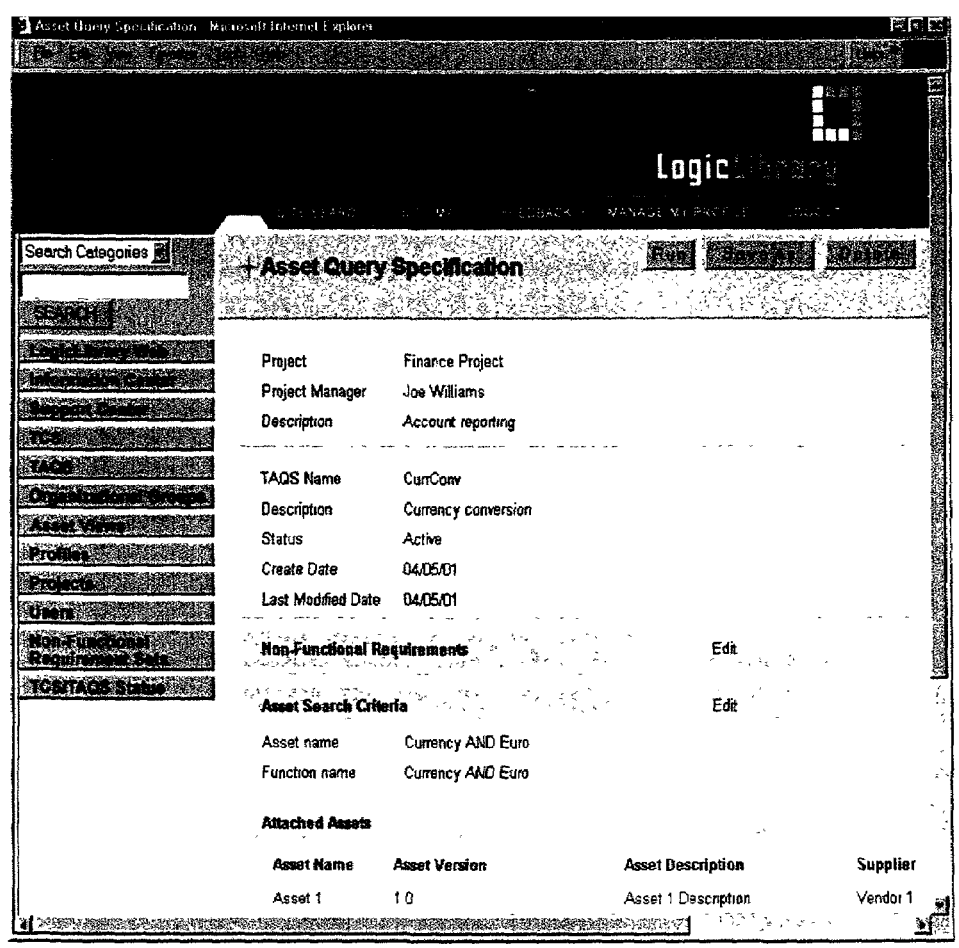
FIG. 27 is a window showing a constructed search specification using keywords.

Keyword searches may also be available through the search engine, as shown in FIG. 27. Particularly in these searches, the search engine preferably makes use of the asset-specific, DRM-specific and enterprise-wide synonyms that were defined during initial library configuration and during asset capture. Thus, when a user searches for "currency," the system returns both assets with functions and datatypes involving "currency" and functions and datatypes involving "money."

In either type of search, the user preferably may specify nonfunctional requirements such as operating system, license type, or language. These requirements may preferably be given weights in the same manner that individual functions can be weighted.

Figure 28:
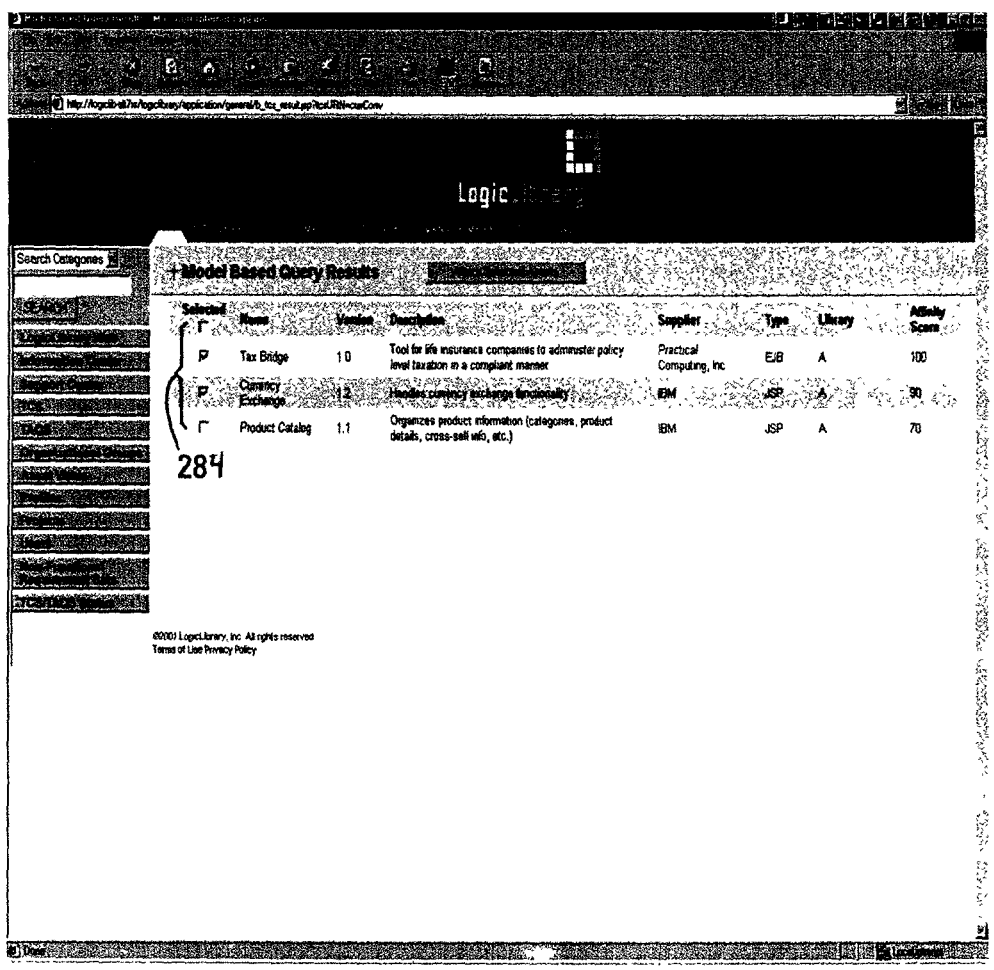
FIG. 28 is a window showing a search result.

A result for the search specification shown in FIG. 26 is shown in FIG. 28. Three potentially useful assets have been identified; they are ranked according to how closely they fit the search criteria. The user may select some or all of the assets returned for further investigation via checkboxes 284. The selected assets are then attached to the search specification, as shown in FIG. 29. The search engine preferably learns by observing which assets are attached, in order to refine its scoring algorithm for later searches; those resources that were attached to the search specification will be preferentially returned in subsequent similar searches.

Figure 30:
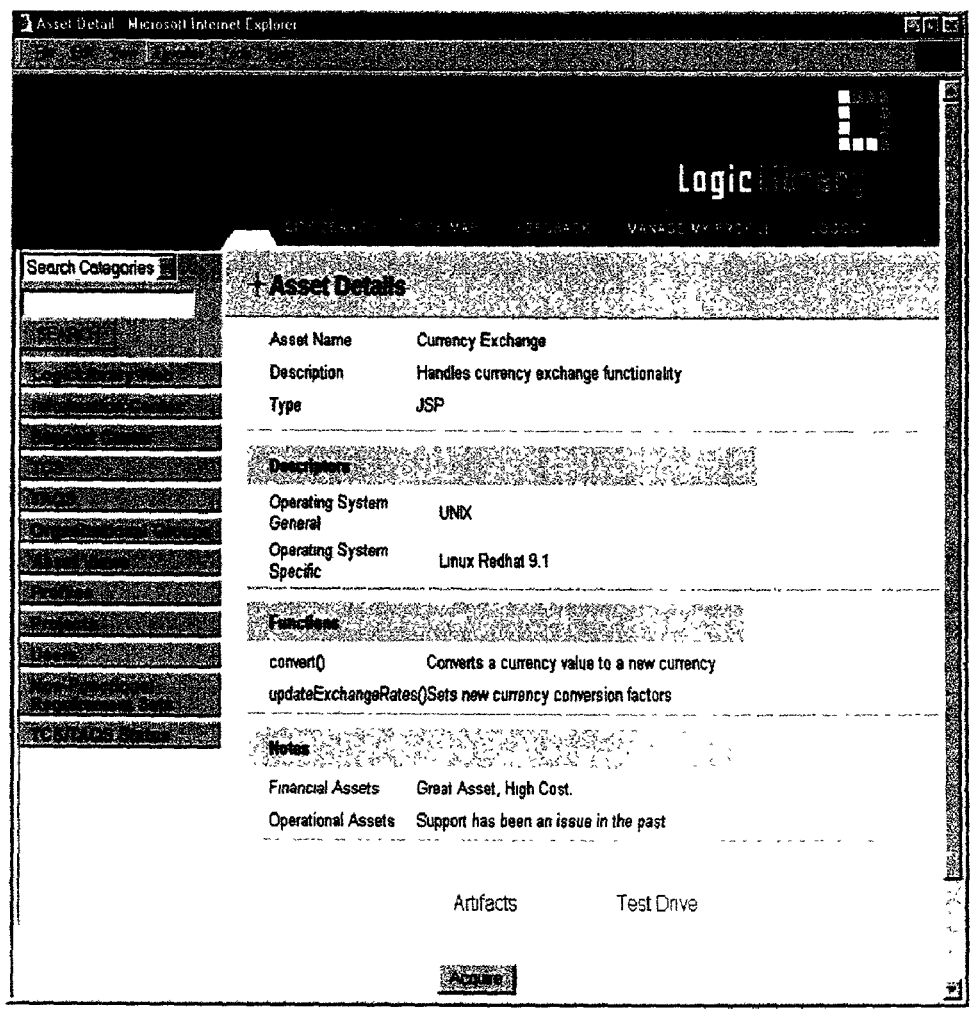
FIG. 30 is a window showing a detailed view of an attached asset.

Before or after the assets have been attached to the search specification, the user can investigate them in more detail, as shown in FIG. 30. The Asset Details window allows the user to view any of the descriptors that were entered during the asset capture process, such as reviews of the asset and support issues. The user can use the detailed data to select the assets he wishes to acquire.

One feature of the invention is that a user who is familiar with business processes, but not with construction of formal technical specifications, can build a search specification and attach useful assets to it. The search specification can be used by others who are less familiar with the business process, but who are familiar with software development, to identify assets that can be readily used together. By allowing such collaboration, the invention provides more effective leveraging of software assets within an enterprise.

In the event that a search specification results in no potentially useful assets being found, the user preferably may specify that the specification be published as an initial requirements document for new asset development. If a partial match is found, the user preferably may similarly publish the unmatched portion of the specification as a requirements document. The user may also choose to mark a search specification such that the user will be informed in the event that any asset subsequently published into the library sufficiently conforms to the specification.

Asset Management

Figure 31:
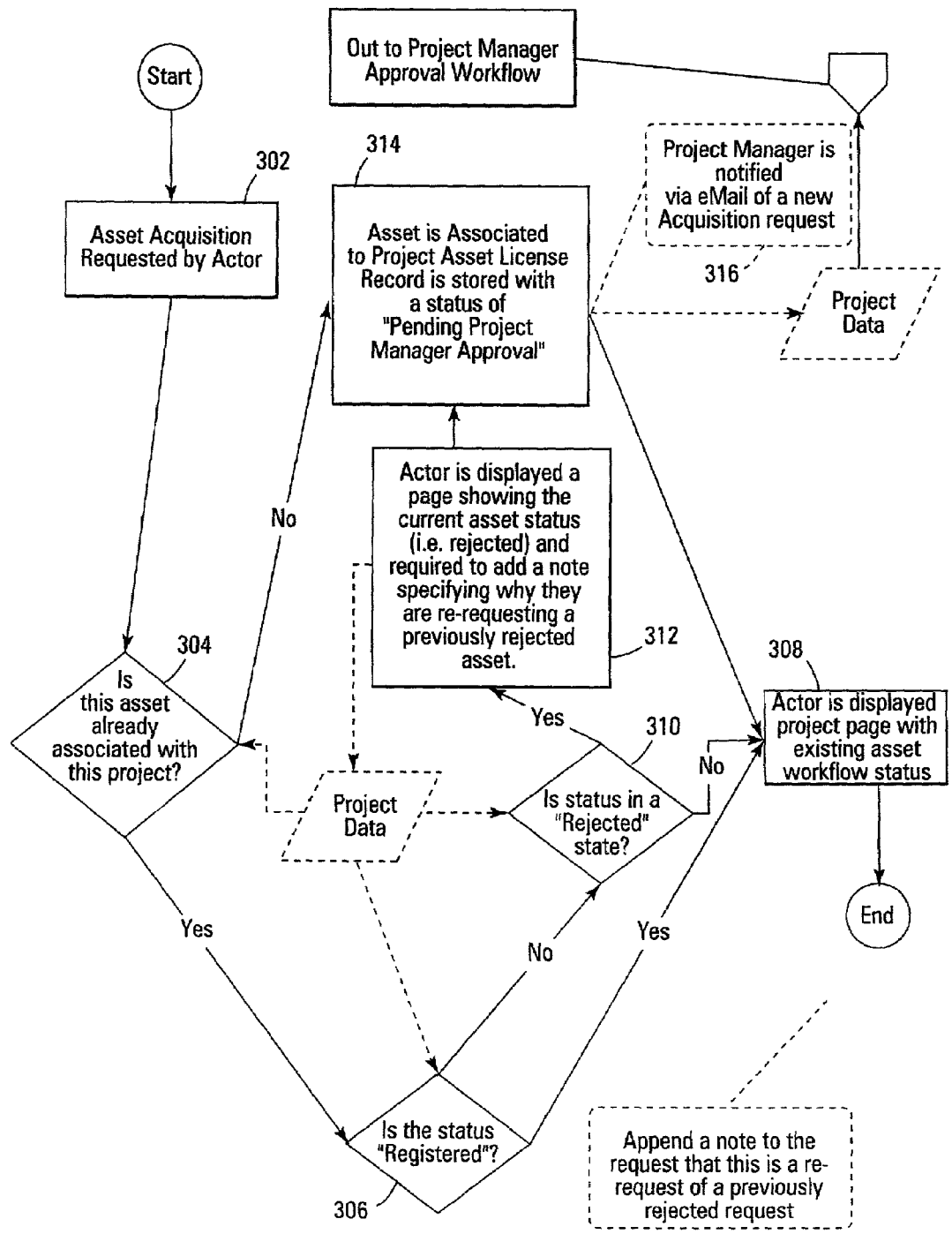
FIG. 31 is a flow chart showing the process for submitting an asset for acquisition.

In preferred embodiments of the invention, the system also facilitates the software asset acquisition process. An acquisition workflow is shown in FIG. 31. Once an appropriate asset or assets have been identified using the search specification, the user may submit an acquisition request 302. Acquisition requests are associated with individual development projects.

The system first determines whether the asset is associated with the project 304. If it is, the system checks to see if the asset is registered 306. If the asset is both associated with the project and registered, then it is already available for use in development and its status is displayed to the user 308. If the asset is associated with the project and not registered, it may be that it is already under consideration by the Project Manager, or that it has previously been rejected. If the system determines that the asset has not been rejected 310, it displays the asset's "pending" status to the user 308. If the asset has previously been rejected, then the user is required either to give a reason for requesting reconsideration of the rejection 312 or to cancel the request.

If the asset is not already associated with the project, or if the user is requesting reconsideration of a rejection, the asset status is set to "pending project manager approval," 314 and the Project Manager is notified 316 of the new acquisition request.

Figure 32:
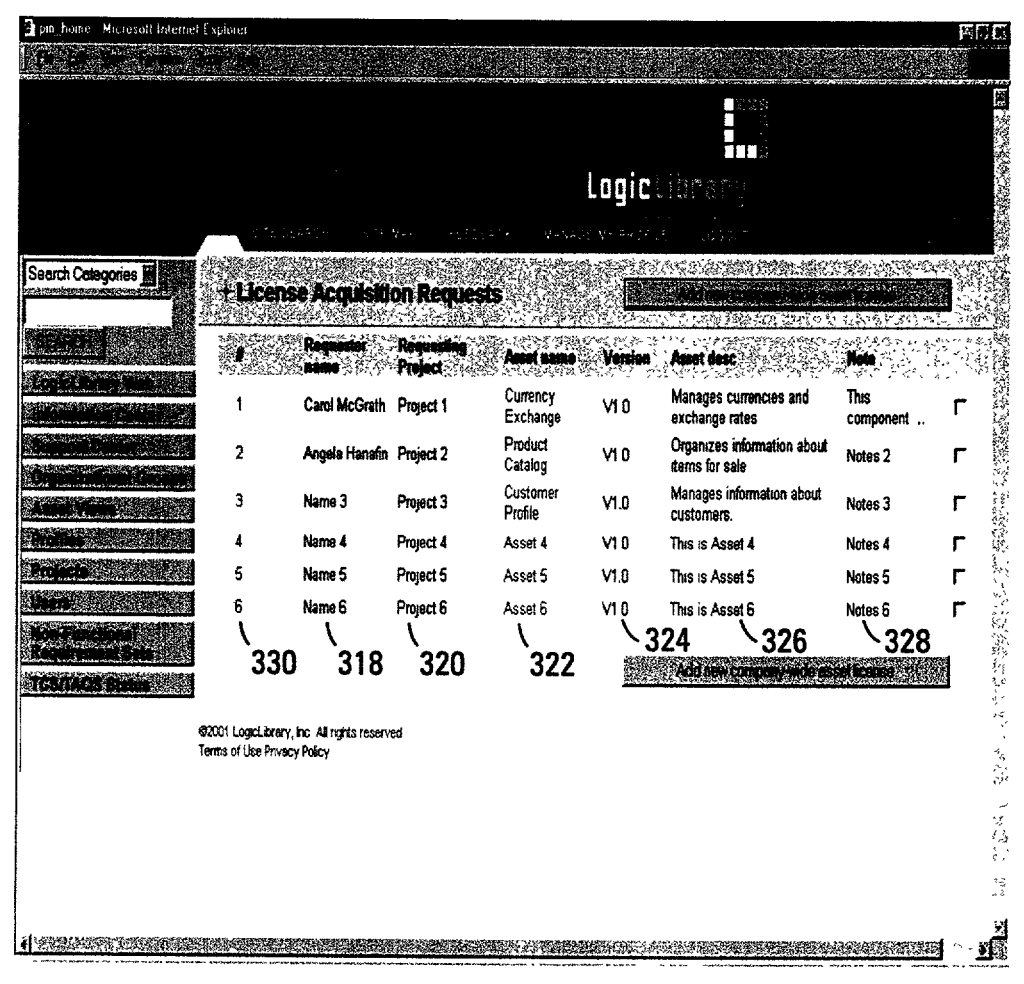

A summary of asset acquisition requests according to one embodiment of the invention is shown in FIG. 32. Depending on the needs of the individual system, this view may be available only to Project Managers and other designated users, to all users for a particular project, or to all users in the system.

Each pending request is preferably listed by requester 318, project 320, and name 322. Additional information may also be included such as version numbers 324, descriptions 326, and notes 328. By selecting links 330, the manager may view the details of any request.

FIG. 33 shows a typical request detail screen for an asset, viewable at least by a Project Manager for a project that has requested the asset. Preferably, all requests for the assets are shown on a single screen, with the reasons for the requests listed by the requesters. If the user viewing the request screen is empowered to acquire software, he may enter license and purchase data via an asset acquisition screen as shown in FIG. 34. (Users empowered to acquire software may also be able to directly access the asset acquisition screen from a search result or by identifying the asset to be acquired manually).

In some embodiments of the invention, the acquisition screen may allow the user to send a purchase order, a request for internally developed assets, or otherwise formally acquire the asset. Alternatively, the acquisition screen may simply memorialize the acquisition of the resource by other channels, as in the screen shown in FIG. 34. In that screen, the acquirer may record any software license keys, describe the location of hardware keys, and make any necessary notes on the conditions of the software purchase. If the license is for a certain number of instantiations or workstations, there may also be provided a mechanism for assigning instantiations or workstations to projects to avoid violating the terms of the license. For internally developed or acquired assets, there may be departmental cross-charges for use of the asset; these may also be tracked in preferred embodiments of the invention.

The system preferably also includes means for tracking the usage of individual assets by different projects. In preferred embodiments, this information may either be viewed directly by the library in the form of prebuilt reports or exported for further processing. As an example of a prebuilt report, FIG. 35 shows a summary of published and unpublished assets created by a particular user or department. For published assets, links 334 allow the publisher or another user to review the projects currently registered to use the asset. For users with the appropriate permissions, departmental cross-charges and the like may be modified.

Various embodiments of the invention have been described. These and other embodiments are within the scope of the following claims.

The invention claimed is:

1. A computer-implemented system comprising:
a plurality of repositories to store software artifacts;
an asset source executing on the computer-implemented system to monitor the one or more of the repositories for addition of one or more new software artifacts, wherein upon detecting the new software artifacts the asset source automatically generates a reusable software asset to include references to the new artifacts within the one or more repositories;
a capture module executing on the computer-implemented system to retrieve the reusable software asset from the asset source in response to receiving an indication from the asset source that the reusable software asset has been generated from the detected artifacts, wherein upon retrieving the reusable software asset from the asset source, the capture module to maps data types and resource functions of the reusable software assets extracted from one or more enterprise repositories to elements of one or more domain models;
a database to store the reusable software asset and data representative of the mapping, wherein database stores the data and the reusable software asset in a searchable form and provides access to the reusable software asset for retrieval of the new software artifacts within the one or more repositories; and
a search engine to perform a model-driven search for selecting one or more of the software assets for reuse by accessing the mapping stored by the database based on user-supplied criteria describing elements for one of the domain models.

2. The computer-implemented system of claim 1, wherein at least one of the domain models comprises:
a process model comprising processes and use cases; and
a structural model comprising reference components, reference interfaces, and reference functions.

3. The computer-implemented system of claim 2, wherein portions of the process model are linked to reference components, reference interfaces, or reference functions of the structural model.

4. The computer-implemented system of claim 2, wherein at least one of the domain models comprises a plurality of process models, portions of each process model linked to reference components, reference interfaces, or reference functions of the structural model.

5. The computer-implemented system of claim 2, wherein the capture module allows the user to map the data types of the software assets to the structural model.

6. The computer-implemented system of claim 2, wherein the capture module allows the user to map the resource functions of the software assets to the structural model.

7. The computer-implemented system of claim 1, wherein the capture module use synonyms to suggest mapping the data types or the resource functions of the software assets to the one or more domain models.

8. A method of classifying a software resource comprising functions and data types, the method comprising:
extracting a software resource from a repository;
receiving a domain model that provides a representation of model functions and model data types for a set of software components;
mapping data types of an application programming interface of the software resource to the model data types of the domain model to produce data type maps;
mapping functions of an application programming interface of the software resource to the model functions of the domain model to produce function maps;
and storing the data type maps and function maps in a searchable database to provide retrieval of the software resource from a plurality of software resources based on the data type maps and the function maps.

9. The method of claim 8, wherein the domain model comprises:
a process model comprising processes and use cases; and
a structural model comprising reference components, reference interfaces, and reference functions.

10. The method of claim 9, wherein portions of the process model are linked to reference components, reference interfaces, or reference functions of the structural model.

11. A computer-implemented system comprising:
a plurality of repositories to store artifacts related to software components deployed by an enterprise;
an asset source executing on the computer-implemented system that monitors one or more of the repositories for new artifacts, wherein upon detecting one or more new artifacts, the asset source automatically generates a reusable software asset to include references to the new artifacts within the one or more repositories;
an asset management system executing on the computer-implemented system to receive the reusable software asset from the asset source and to store the reusable software asset within a searchable asset library; and
a rules engine to generate metadata that maps the software asset to elements of one or more models.

12. The computer-implemented system of claim 11, wherein the asset source generates the reusable software asset in a format that complies with a data description language.

13. The computer-implemented system of claim 12, wherein the data description language comprises the extensible markup language (XML).

14. The computer-implemented system of claim 11, wherein the reusable asset source comprises a staging area to store the software asset prior to storage within the asset library by the asset management system,
wherein the asset source validates the asset in the staging area prior to outputting the indication to the capture module that the reusable software asset has been generated from the detected artifacts and is ready for publishing to the asset library.

15. The computer-implemented system of claim 11, further wherein the asset source generates the reusable software asset in a normalized format in accordance with an asset template.

16. The computer-implemented system of claim 15, wherein the asset template defines a schema for the reusable software asset in accordance with a data description language.

17. The computer-implemented system of claim 11, wherein the asset source comprises a writable interface for editing the reusable software asset.

18. The computer-implemented system of claim 11, wherein the asset source comprises an artifact storage to cache artifacts extracted from the repositories prior to communicating the reusable software asset to the asset management system for storage within the asset library.

19. The computer-implemented system of claim 11, further comprising an asset capture tool to update the software asset based on additional artifacts.

20. The computer-implemented system of claim 19, wherein the asset capture tool includes a user interface to receive the additional artifacts from a user.

21. The computer-implemented system of claim 19, wherein the asset capture tool includes scripts to generate the additional artifacts.

22. The computer-implemented system of claim 11, further comprising:
- an asset template that defines a schema for a software asset in accordance with a data description language; and
- an asset capture tool executing on the computer-implemented system to automatically update the software asset in accordance with the asset template, wherein the asset capture tool executes on the computer-implemented system to automatically identify missing artifacts from the software asset based on the asset template.

23. The computer-implemented system of claim 11, further comprising an asset retrieval module to selectively retrieve the software asset from the Asset library based on the metadata.

24. The computer-implemented system of claim 11, wherein the models comprises at least one of a process model, a structural model, a resource model, and an implementation model.

25. The computer-implemented system of claim 11, further comprising an asset retrieval module executing on the computer-implemented system to receive input from a user selecting an element of a model, and to selectively retrieve the software asset from the asset library based on the input.

26. The computer-implemented system of claim 25, wherein the asset retrieval module generates a search specification based on the user input.

27. The computer-implemented system of claim 26, further comprising a scoring engine to score the software asset within the asset library against the search specification.

28. The computer-implemented system of claim 11, wherein the artifact comprises one of source code, binary code, a requirements specification, a design document, a model, a use case, and a collaboration diagram.

29. A computer-implemented system comprising:
- a domain model having one or more model elements that map business processes to software components;
- a central asset management database to store reusable software assets, wherein the software assets include references that identify locations of software artifacts stored within a plurality of different repositories distributed throughout an enterprise;
- a rules engine to generate metadata that maps the reusable software assets to the elements of the domain model; and
- an asset retrieval module executing on the computer-implemented system that presents a graphical user interface (GUI) outputting a graphical representation of the domain model, wherein the asset retrieval module receives input from a user selecting one of the model elements of the domain model, and in response to the selection, the asset retrieval model constructs a search specification to selectively retrieve a subset of the software assets from the central asset management database based on the selected elements of the domain model.

30. The computer-implemented system of claim 29, wherein the domain model comprises one of a process model, a structural model, a resource model, and an implementation model.

31. The computer-implemented system of claim 29, wherein the asset retrieval module generates a search specification based on the user input.

32. The computer-implemented system of claim 31, further comprising a scoring engine to score the software assets within database against the search specification.

* * * * *

UNITED STATES PATENT AND TRADEMARK OFFICE
CERTIFICATE OF CORRECTION

| | | |
|---|---|---|
| PATENT NO. | : 7,149,734 B2 | Page 1 of 1 |
| APPLICATION NO. | : 10/109601 | |
| DATED | : December 12, 2006 | |
| INVENTOR(S) | : Carlson et al. | |

It is certified that error appears in the above-identified patent and that said Letters Patent is hereby corrected as shown below:

Title Page 1, No. (63), "Continuation-in-part of application No. 09/900,101, filed on Jul. 6, 2001."

should read -- Continuation-in-part of application No. 09/900,101, filed on Jul. 6, 2001, and continuation-in-part of application No. 10/100,749, filed on Mar. 18, 2002. --

Signed and Sealed this

Twenty-second Day of June, 2010

David J. Kappos
*Director of the United States Patent and Trademark Office*